United States Patent [19]

Kohara

[11] 3,743,851

[45] July 3, 1973

[54] MAGNETIC SINGLE WALL DOMAIN LOGIC CIRCUIT

[75] Inventor: Haruki Kohara, Minato-ku, Tokyo, Japan

[73] Assignee: Nippon Electric Co., Ltd., Tokyo, Japan

[22] Filed: Nov. 1, 1971

[21] Appl. No.: 194,435

[30] Foreign Application Priority Data

Nov. 5, 1970 Japan ............................... 45/97354

[52] U.S. Cl... 307/88 LC, 340/174 TF, 340/174 SR

[51] Int. Cl. H03k 19/168, G11c 11/14, G11c 19/00

[58] Field of Search ............................ 340/174 TF; 307/88 LC

[56] References Cited

UNITED STATES PATENTS

| | | | |
|---|---|---|---|
| 3,508,225 | 4/1970 | Smith | 340/174 TF |
| 3,541,522 | 11/1970 | Bobeck et al. | 340/174 TF |
| 3,651,496 | 3/1972 | Danylchuk et al. | 340/174 TF |

*Primary Examiner*—Stanley M. Urynowicz, Jr.
*Attorney*—Richard C. Sughrue, Darryl Mexic et al.

[57] ABSTRACT

A magentic logic circuit creates and moves around cylindrical magnetic domains (magnetic bubbles) to provide a plurality of logic functions. Magnetic bubbles are created and transferred to a plurality of magnetic weighting circuits. The transfer of a magnetic bubble to a weighting circuit corresponds to a single logic input. Each weighting circuit divides the magnetic bubble applied thereto into a predetermined number of magnetic bubbles by splitting the input magentic bubble. A magnetic arrangement circuit having a plurality of magnetic bubble retaining locations arranged in columnar fashion receives all of the magnetic bubbles from the weighting means. Each bubble is initially placed in a separate location of the arrangement means. The magnetic bubbles are then moved in the direction of one end of the column of locations to result in a final arrangement of magnetic bubbles. The final arrangement is independent of the initial locations of bubbles in the arrangement means. It is dependent upon the total number of bubbles placed in the arrangement means, the actual position of the bubble holding locations and the repulsion of adjacent bubbles. The presence or absence of bubbles in locations of the arrangement means following arrangement is indicative of a logic combination of the logic inputs. Gating means are provided to transfer the magnetic bubbles from final locations of the arrangement means to corresponding output means where a plurality of detector means can detect the presence of magnetic bubbles to provide output indications of various logic functions.

13 Claims, 33 Drawing Figures

United States Patent [19]
Kohara
[11] 3,743,851
[45] July 3, 1973
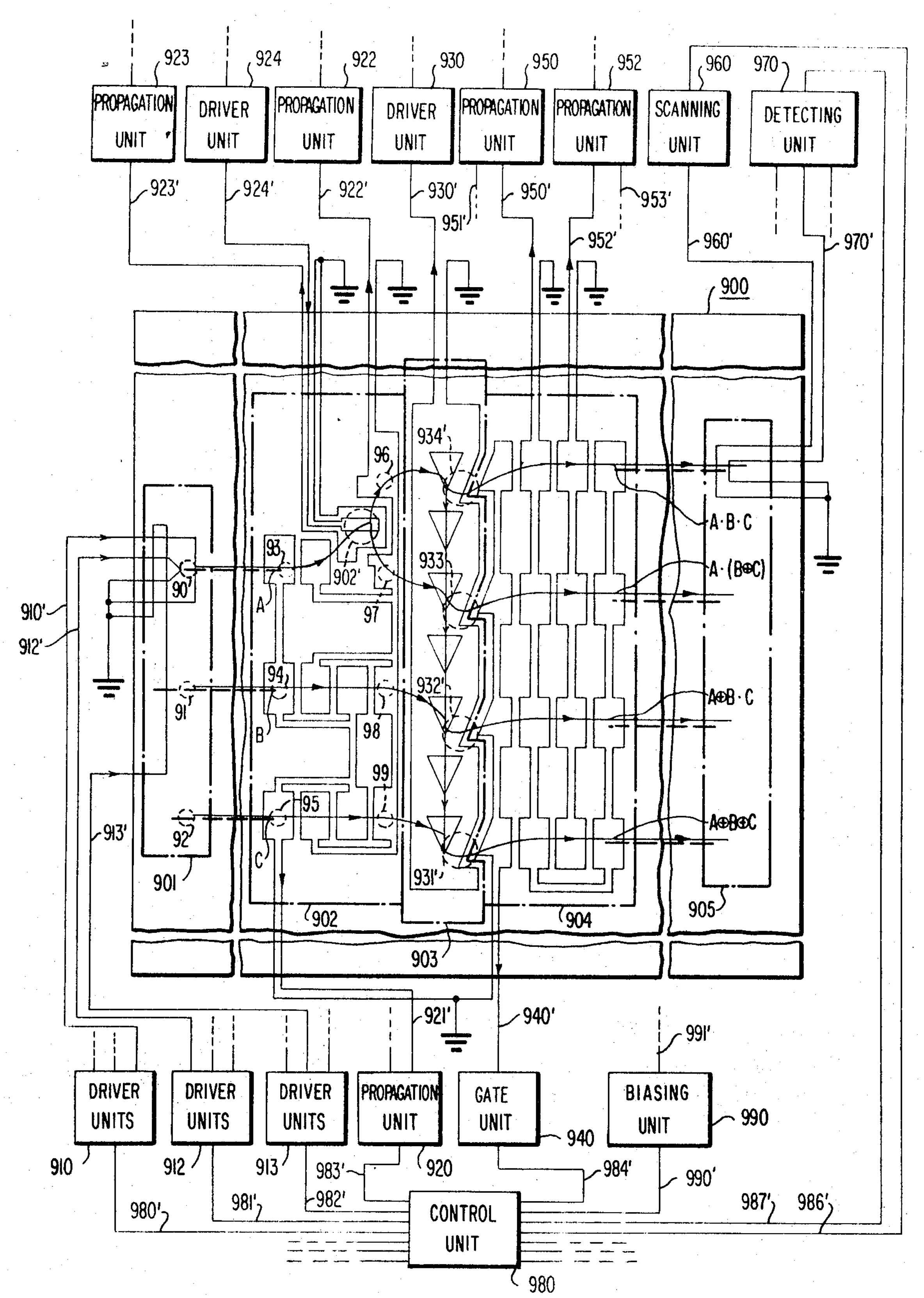

Patented July 3, 1973

3,743,851

9 Sheets-Sheet 8

MAGNETIC SINGLE WALL DOMAIN LOGIC CIRCUIT

BACKGROUND OF THE INVENTION

This invention relates to a magnetic threshold logic circuit utilizing cylindrical magnetic domains (bubble domains) which are generated in orthoferrites or similar magnetic materials. This invention finds application in memory and operation circuits of information processing systems such as electronic computers and learning machines.

It has been known that cylindrical magnetic domains, generated in the so-called orthoferrites containing rare earth elements or in other magnetic materials, can be used to perform logic and memory operations. The general properties of the orthoferrites are described in detail in a paper titled, "Properties and Device Application of Magnetic Domain in Orthoferrites" appearing in "Bell System Technical Journal" October issue, 1967, Pages 1,901 to 1,925. The so-called "T-Bar system" suited to use the orthoferrites as logic and memory, is disclosed in papers titled "Application of Orthoferrites to Domain Wall Devices": and "Propagation to Cylindircal Magnetic Domain in Orthoferrites", pages 25.2 and 25.3, published in "Abstracts of the Intermag Conference", April, 1969.

The general structure of a logic circuit using the cylindrical magnetic domain is disclosed in U.S. Pat. No. 3,541,522, issued on Nov. 17, 1970. In the patent specification, predetermined ones of a plurality of input signals are divided and moved to predetermined regions. Then, logic combinations (AND, OR) are performed among the divided signals to produce logic outputs in parallel. For example, the dividing operation is illustrated in FIGS. 4 through 7 of the drawings of the patent, while the logic and the output operations are shown in FIGS. 14 through 19 and in FIG. 42, respectively. However, such prior art logic circuits using cylindrical magnetic domains are adapted to perform only the binomial operations of AND or OR, etc. As a result, when complicated logic operations of a number of input variables are intended, the binomial operation circuits must be connected in cascade. For this reason, the logic circuits of the prior art become complicated and occupy a relatively large amount of space. Also, unfavorable space factor increases the cost of manufacture. If, for example, logic operations conforming to a logic function of $A \cdot B \oplus C$ is required for three inputs A, B and C, the logic operation of $A \cdot B$ is carried out to produce an output D by an AND circuit, and then, the logic operation $D \oplus C$ is performed by an OR circuit. (The notation $\oplus$ is used herein to indicate the Boolean logic OR function and to distinguish that function from the algebraic plus function, represented by the symbol +). In this way, the logic operations of "$A \cdot B \oplus C$" are performed stepwise. In this operation, however, if logic operations conforming to other logic functions such as $A \cdot B \cdot C$ and $A \cdot (B \oplus C)$ are simultaneously required and if there are more inputs, the circuit arrangement will be very complicated. This is attributable to the fact that the above-mentioned basic circuit has only certain specific logic operations and that it is not adapted to other logic functions. Also, even if such logic elements are in the form of integrated circuits rather than magnetic circuits, their use is subject to the same restriction.

Moreover, the general structure of threshold logic circuits of prior art is shown in FIG. 1. In FIG. 1, X1, X2, ...., X*n* designate binary input information at the respective input positions 11 - 1, 11 - 2, .... and 11 - *n*, while W1, W2, .... and W*n* represent respective weights for the binary input information X1, X2, .... and X*n* supplied to weight circuits 12 - 1, 12 - 2, .... and 12 - *n*, respectively. At respective output positions 13 - 1, 13 - 2, .... and 13 - *n* corresponding to the weight circuits 12 - 1, 12 - 2, .... and 12 - *n*, the results of operations $X1 \cdot W2$, .... and $Xn \cdot Wn$ are obtained after multiplication of the binary input information by the weights. An adder circuit 14 performs the addition of $X1 \cdot W1 + X2 \cdot W2 + .... + Xn \cdot Wn$ for the outputs of the weight circuits. The resultant sum is compared with the threshold values (In FIG. 1, it is assumed that the upper limit is $t_1$ while the lower limit is $t_2$) at a threshold circuit 15 at the next stage. The threshold circuit 15 produces a logic output 1 at an output position 16, if the input (summation output) is larger than $t_1$. On the other hand, the circuit 15 produces a logic output 0, if the input is smaller than $t_2$. The threshold values are fixed, together with the weights, at suitable values depending on logic functions to be performed by a threshold logic circuit.

With the circuit arrangement of FIG. 1, conventional Boolean function logic gates such as AND and OR gates can be composed. For instance, it is assumed that three inputs A, B and C are applied to the input positions, that the weights to the respective inputs are *a*, *b* and *c*, and that the logic function is represented by a notation $[aA + bB + cC]\ t1, t2$ (The reference characters $t_1$ and $t_2$ represent the threshold values of the threshold circuit). If $aA + aB + cC \geqq t_1$, the logic function has the value of 1, while if $aA + bB + cC \leqq t_2$, it has the value of 0. Assuming now that $a = b = c = 1$, the logic function becomes $[A + B + C]\ t1, t2$. In addition, when $t_1 = 3$ and $t_2 = 2$ are given, the logic function becomes $[A + B + C]$ 3,2, representing $A \cdot B \cdot C$ of the Boolean logic function. Similarly, $[A + B + C]_{2,\ 1}$ represents $A \cdot B \oplus B \cdot C \oplus C \cdot A$, while $[A + B + C]_{1,\ 0}$, represents $A \oplus B \oplus C$. Also, when the values of the weights are changed, the logic function varies with respect to the same threshold values. This is easily understood from the fact that when, for example, $a = 2$ and $b = c = 1$, the logic function $[2A + B + C]_{t1,\ t2}$ varies depending upon the values of $t_1$ and $t_2$ so as for $[2A + B + C]_{4,\ 3}$ corresponding to $A \cdot B \cdot C$, for $[2A + B + C]_{3,\ 2}$ to $A \cdot (B \oplus C)$, for $[2A + B + C]_{2,\ 1}$ to $A \oplus B \cdot C$, and for $[2A + B + C]_{1,\ 0}$ to $A \oplus B \oplus C$. As is apparent from the foregoing, two sets of values of the weights are employed to the threshold logic circuit. However, if a plurality of threshold circuits capable of independently setting different threshold values $t_1$ and $t_2$ in the circuit arrangement are provided, logic outputs corresponding to a plurality of logic functions are produced from the logic circuit.

As practical examples of the threshold logic circuits, the logic operation is performed by the application of resistor currents (or voltages) using resistance transistor circuits, and of magnetic flux. Detailed explanation of such circuits are given in the "PROCEEDINGS OF the I.R.E.", Vol. 43, pp. 570–584, May issue, 1955, and "I.R.E. TRANSACTIONS", EC-8, pp. 8–12, March issue, 1959. These conventional techniques have various disadvantages. For example, the former has problems on the dispersion of resistance, the fluctuations of currents, and noise, while the latter has poor accuracy, such a low operation speed as requires additional circuits, such as transistor circuits to detect outputs, and insufficient miniaturization.

SUMMARY OF THE INVENTION

It is, therefore, one object of this invention to provide a magnetic threshold logic circuit which is free from the above-mentioned disadvantages.

The magnetic threshold logic circuit of this invention comprises a flat plate shaped magnetic material capable of retaining cylindrical magnetic domains, first magnetic field generating means for normally giving a biasing magnetic field in a first direction perpendicular to the magnetic material, second magnetic field generating means for giving magnetic field in said first direction and in a second direction opposite to the first direction to predetermined means on the magnetic material, which varies with respect to time and space; a plurality of input means for leading cylindrical magnetic domain patterns corresponding to input signals to the magnetic material, a magnetic domain dividing means for receiving said magnetic field in the first and second directions at a first predetermined order from the second magnetic field generating means and for dividing said cylindrical magnetic domains fed from said plurality of input means into a plurality of predetermined magnetic domains to produce outputs, a magnetic domain arrangement means for receiving the magnetic field in the first and second directions at a second predetermined order from said second magnetic field generating means and for moving the plurality of cylindrical magnetic domains supplied from said dividing means to arrange at a plurality of predetermined arrangement positions, gate means for moving predetermined ones of cylindrical magnetic domains arranged at the arrangement positions to produce outputs from the arrangement means, and output means having threshold values corresponding to said plurality of arrangement positions for receiving said magnetic domains fed from the arrangement means under the control of the gate means to generate a plurality of logic outputs corresponding to the threshold values, said respective means being arranged on the magnetic material in the order mentioned above.

Thus, inasmuch as the logic circuit of this invention is composed of the property of the cylindrical magnetic domain elements, the circuit has various advantages as follows.

First, the diameter itself of the magnetic domain is remarkably small. For example, with samarium-series orthoferrites, the diameter is approximately 20 microns. Also, if the materials of garnet-series orthoferrites are employed, the diameter can be reduced to several microns or so. Thus, the circuit using such material becomes remarkably small in size, and can have high density. Second, when the presence and absence of the cylindrical magnetic domain correspond to information, the magnetic domain itself can be used as a signal, thus requiring no additional circuits. Third, since an adder circuit section is capable of performing the digital addition such as counting of the total number of the magnetic domains, the accuracy is remarkably improved. Fourth, the moving speed of the magnetic domain can be made considerably high, and approximately 10 MHz clock can be realized. Fifth, the information is non-volatile so long as biasing means is stable, and the external disturbing magnetic field gives problems only in one direction, i.e. the direction of the cylindrical magnetic domain. For this reason, the protection for the disturbing magnetic field is easily taken. Therefore, when a threshold logic circuit is constructed by utilizing the cylindrical magnetic domain, the logic circuit has various advantages in comparison with that of prior art.

DETAILED DESCRIPTION OF THE INVENTION

Figure 1:
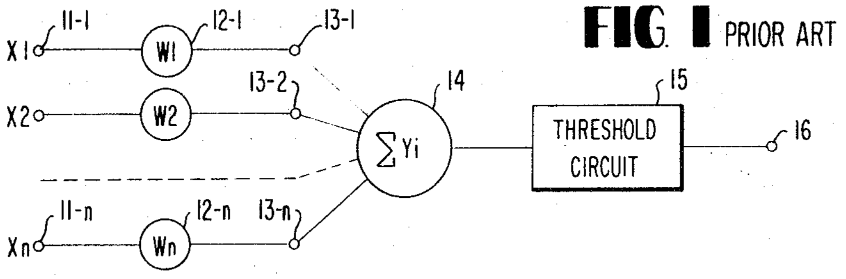
FIG. 1 PRIOR ART
FIG. 1 shows a schematic diagram of the arrangement of a general threshold logic circuit.
Figure 2:
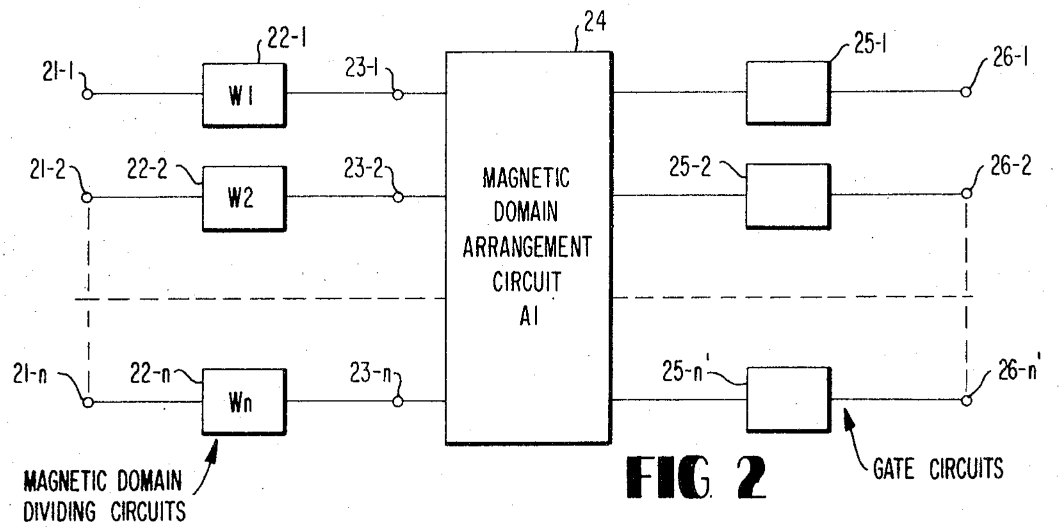
FIG. 2 shows a schematic block diagram of one embodiment of this invention.

In FIG. 2 which shows a block diagram of one embodiment of the magnetic threshold logic circuit of this invention the logic circuit is composed of a plurality of input positions 21-1, 21-2, ...., and 21-*n*, magnetic domain dividing circuits 22-1, 22-2, ...., and 22-*n*, a magnetic doamin arrangement circuit 24, and output circuits (gate circuits) 24-1, 25-2, ...., and 25-*n*. More specifically, N input signals with the presence and absence of the cylindrical magnetic domain corresponding to signals 1 and 0, are applied to the input positions 21-1, 21-2, ...., and 21-*n* respectively, and the domains are led to the magnetic domain dividing circuits 22-1, 22-2, ...., and 22-*n*, respectively. Each magnetic domain is divided into W1, W2, ...., and W*n* by the corresponding dividing circuit, and the numbers of the division correspond to the weights for the input signals. Subsequently, the divided cylindrical magnetic domains are fed to the circuit 24 at the next stage, and are arranged in a row in the order from the bottom. The adding operation is performed in the circuit 24. This is due to the fact that the domains are aligned in a row in the order from the bottom owing to the repellance of the cylindrical magnetic domains, and consequently that the length of the arrangement represents the added value. At this time, those which correspond to the threshold values of the threshold circuit of the prior art in FIG. 1 are the arranged positions shifted by a number equivalent to the threshold value $t_1$ or $t_2$, calculating from the lowest position in the arrangement of the magnetic domains. It is assumed here that when the magnetic domain is present at the arranged position shifted by the number $t_1$ from the lowest position, the logic output is 1, whereas if the magnetic domain is absent at the arranged position shifted by the number $(t_2+1)$, the logic output is 0. Assuming that $t_2= t_1- 1$, the gate circuits 25-1, 25-2, ...., and **25-*n* are provided at the arranged positions corresponding to the threshold value $t_1$, and the gate circuits corresponding to desired logic function are opened thereby to read out the cylindrical magnetic domains at output positions 26-1, 26-2, ...., and 26-*n*. Thus, logic outputs of desired logic functions are obtained. It corresponds to a change of the logic function to change the threshold value without altering the value of the weight. For this reason, the gate circuits corresponding to the required logic functions are used as shown in FIG. 2** in order to allow a number of threshold values to be simultaneously set, and the gate circuits are simultaneously opened, whereby logic operations in conformity with a number of logic functions are carried out in parallel. Such operations have been impossible with the conventional logic circuit utilizing the cylindrical magnetic domain and the threshold logic circuit.

Figure 3A:
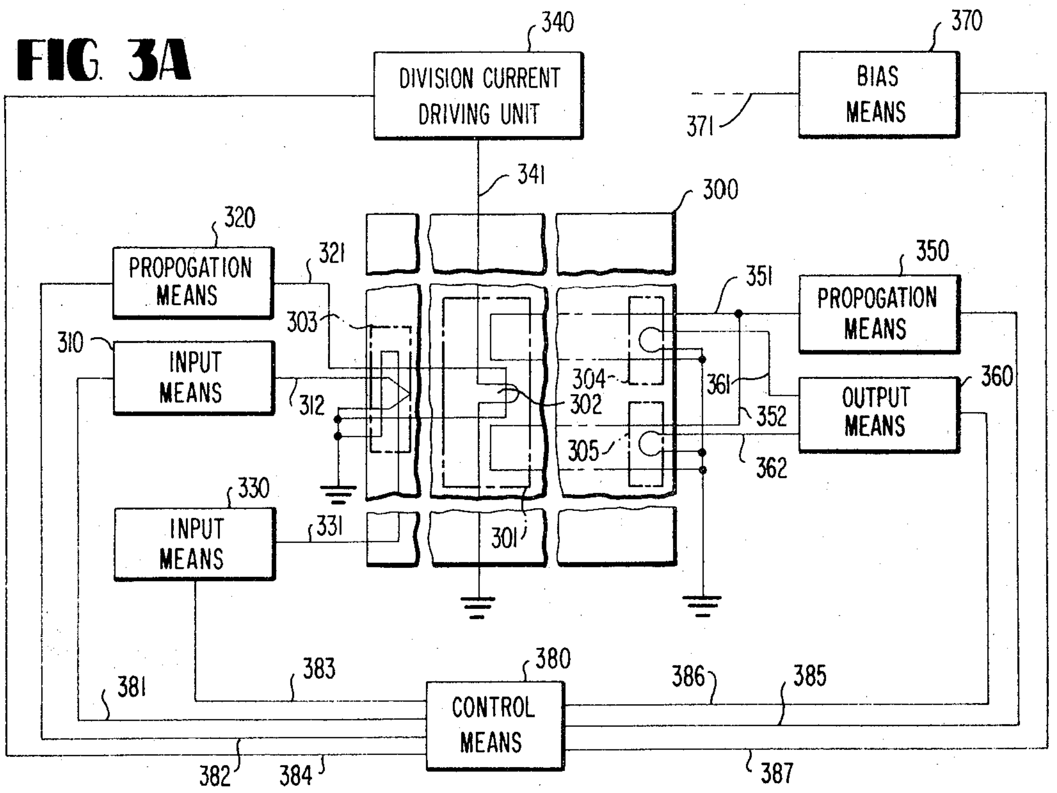
FIG. 3A shows a diagram illustrating in detail a first example of a magnetic domain dividing circuit for use in the magnetic threshold logic circuit of this invention.

FIG. 3A shows the first example of the magnetic domain dividing circuit employed in the magnetic threshold logic circuit of this invention.

FIG. 3A specifically emphasizes the part of the magnetic domain dividing circuit in the magnetic domain threshold logic circuit. This dividing circuit comprises a magnetic material piece 300 capable of retaining cylindrical magnetic domains, input means 310, 312, 330 and 331 for generating a cylindrical magnetic domain in the material piece 300 in accordance with information from the external circuit, a magnetic domain dividing means 301 consisting of a division current driving unit 340 and a division conductor loop 341, means 320 and 321 for leading the cylindrical magnetic domain to the dividing means 301, means 350 and 351 for moving the divided magnetic domains to produce outputs, output means 361, 362 and 360 for detecting the presence or absence of the cylindrical magnetic domain, bias means 370 and 371 for holding the cylindrical magnetic domain in the magnetic material, and control means 380 for controlling the respective means. The magnetic domain dividing means is particularly shown at the part of numeral 301 in the piece 300. In this example, as the material 300 capable of retaining cylindrical magnetic domains, orthoferrites, magnetoplancheite and garnet are employed. The easy axes of these magnetic materials lie in the direction of the thickness of the element. When a suitable biasing magnetic field is applied in the easy axis direction, a cylindrical magnetic domain having magnetization opposite to the biasing magnetic field can be retained. For example, when a biasing magnetic field of 30 Oe. is applied to a 90-micron thick yttrium orthoferrites, a cylindrical magnetic field having a diameter of approximately 140 microns is obtained. Also, if the biasing magnetic field is below 30 Oe., the domain increases the diameter to ultimately become a magnetic domain of a stripe. On the other hand, when the magnetic field exceeds 30 Oe., the diameter of the magnetic domain is decreased. For example, with the magnetization above 36 Oe., the magnetic domain disappears. In this manner, the enlargement and reduction of the magnetic domain depends on the magnitude of the magnetic field in the direction of the easy axis, and this magnetic field is used for the movement of the magnetic domains. More specifically, when a magnetic field inclined to the direction of the easy axis is applied, the magnetic domain moves along the inclined magnetic field. As means for applying such inclined magnetic field, the example of FIG. 3A includes a method of causing current to flow through the conductor patterns 312, 321, 331, 341, 351, 352, 361 and 362 which are arranged directly or indirectly through an insulating material such as SiO, on the upper or lower surface of the magnetic material piece. FIG. 3A shows a diagram of the circuit viewed from above.

The dividing meand 301 is formed on a part of the piece 300. The magnetic domain is divided at a central part 302 of the dividing means 301. The operation of leading the magnetic domain to the part 302 is carried out such that the magnetic domain is generated at a magnetic domain generating part 303 according to input information, and a drive current is caused to flow through the loop 321 for propagation by means of the driving unit 320. For example, current is normally caused to flow through DC bias coil 312 by means of a DC power source 320, thereby retaining a cylindrical magnetic domain. The cylindrical magnetic domain may be initially created in a known manner and positioned in the loop of coil 312. Subsequent to the initial creation of said cylindrical magnetic domain, the current through loop 312 in combination with the aforementioned biasing means is sufficient to retain said domain within said loop. Current representing a logic 1 input is supplied from the input signal generating unit 330 to the generating gate coil 331 at an appropriate time, resulting in a magnetic field in a direction opposite to that of the magnetic field caused by the DC coil 312. The result is that the magnetic domain on part 303 is split in two. After this operation, one of the magnetic domains remaining at part 303, while the other magnetic domain is controlled by the propagation coil 321 and propagated to a branching point 302 of the circuit 301. The principle of the magnetic domain generating operation is described in "IEEE TRANSACTIONS ON MAGNETICS," Vol. 5, No. 3 pp. 544–553 September issue, 1969. In the case where input source 330 supplies no current to coil 331, corresponding to a logic 0 input, no magnetic domain will be transferred to divider means 301.

Once the cylindrical magnetic domain has been given to the magnetic domain dividing circuit, current flows through the driving unit 340 to the conductor loop 341, and the magnetic domain at the point 302 is divided into two. After this time, one of the divided domains is supplied to an output circuit 304 by the propagation conductor loop 351. The other magnetic domain is fed to an output circuit 305 by a propagation conductor loop 352. Outputs from the output circuits 304 and 305 are detected by the detecting circuit 360 in the form of output currents (or voltages) respectively induced in the detecting coils 361 and 362 (in response to the presence or absence of the cylindrical magnetic domain). Then, the output currents are converted into predetermined electrical signals to be used in utilization circuit (not shown). The operation control of the magnetic domain dividing circuit is carried out by the control circuit 380. Each of the current supply units 310, 320, 330, 340, 350 and 370 and the detecting circuit 360 are connected to the control circuit 380 through control lines 381, 382, 383, 384, 385, 387 and 386 respectively, to perform transfer and receipt of signals.

The biasing magnetic field for holding the cylindrical magnetic domain in the piece 300 is applied in the thickness direction of the piece 300 through the bias coil 371 from the biasing magnetic field supply unit 370. The bias coil 371 is omitted from the drawing for clarity thereof. Such bias supply means is not restricted to the bias coil, but it is also possible to establish a static magnetic field by means of a permanent magnet (for example, barium ferrite etc.), which is not illustrated herein either.

The operation of the magnetic domain dividing means 301 is given in FIGS. 3B through 3I.

The operation is similar in principle to the magnetic domain generating operation taught in the above-mentioned reference "IEEE TRANSACTIONS ON MAGNETICS." They differ, however, in that the cylindrical magnetic domain to be divided is mobile in the former, whereas it is stationary in the latter. More specifically, in the magnetic domain dividing circuit of this invention, a cylindircal magnetic domain enters the input part of the dividing circuit in accordance with an information (for example, if the information is 1, one cylindrical magnetic domain is received, and if the information is 0, no cylindrical magnetic domain is received). Cylindrical magnetic domains are respectively used as information signals to the next circuits, after being divided. On the other hand, in the latter system or in the system described in the above-mentioned reference, a cylindrical magnetic domain is always fixed at a part referred to as a generating source, which is adapted to hold the magnetic domain. The generation gate switch is opened in response to information applied, whereby a part of the fixed magnetic domain is cut away (replicated). Thus, only one of the magnetic domains is used as an information to the next circuit, and the other magnetic domain remains held in the generating source as it is. When this is viewed from the aspect of the dividing operation control, in the former, the division gate is stationary and normally takes the open form to constitute the so-called fan-out circuit. However, a division (replication) gate in the latter is a dynamic one (a mere gate) which performs open and closure operation in response to information supplied.

Turning now back to the explanation of the operation in FIGS. 3B through 3I, FIGS. 3B through 3E show the operation of a dividing circuit (or fan-out circuit) for dividing a cylindrical magnetic domain into two, and FIGS. 3F through 3I show the operation of a circuit for dividing the same into three as an example of the case where the number of the division is large.

The following points common to FIGS. 3B through 3I are indicated. The respective driving coils 321, 341, 351 and 352 are arranged on the upper surface of the magnetic material piece 301, and they are viewed from above (from the face towards the back of a paper). The biasing magnetic field is assumed to be exerted from the face towards the back of the paper. Accordingly, magnetization of the cylindrical magnetic domain is directed to the direction opposite to the biasing magnetic field, from the back towards the face of the paper, and is illustrated by the hatching in the drawings. Arrows on each driving coils 321, 341, 351 and 352 indicate the direction of flowing currents, and a part on the right side of each driving coil along the arrows gives a magnetic field in the direction of enlarging the cylindrical magnetic magnetic domain. Also, a part on the left side of each driving coil gives a magnetic field in the direction of reducing the magnetic domain. One of the ends of each driving coil is grounded, and the other end is led to a positive or negative power source. More particularly, a plus or minus sign represents the polarity of such power source, and if no sign is attached to the other end, no power source is connected thereto.

Figure 3B:
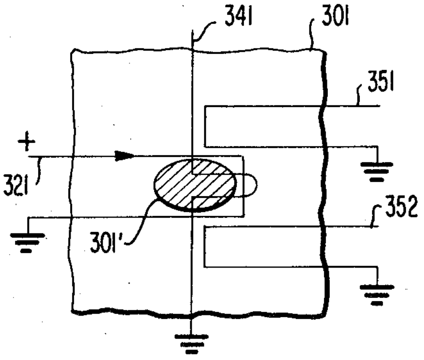
FIGS. 3B, 3C, 3D, 3E, 3F, 3G, 3H and 3I show diagrams for explaining the operation of the dividing circuit.
Figure 3C:
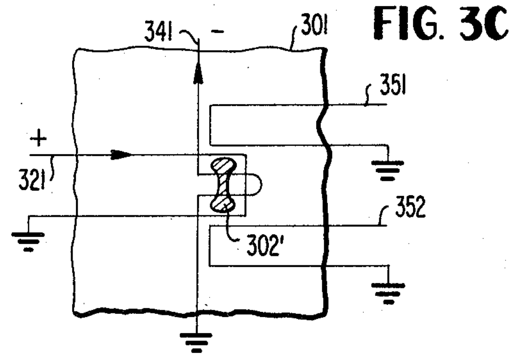

FIG. 3B shows a condition under which a cylindrical magnetic domain 301', as information from the input circuit or another circuit, is introduced into the dividing circuit by causing current to flow through the propagation coil 321 in the direction of the arrow. Next, current is suppled to the dividing coil 341 in the direction of the arrow, with the current left flowing through the propagation coil 321. Then, magnetic field in the direction of reducing the diameter of the magnetic domain is supplied to the central part of the domain 301', simultaneously, at the periphery of the magnetic domain (the upper and lower directions of the paper viewed in the drawing), the magnetic fields by the dividing coil 341 and the propagation coil 321 are added to establish a magnetic field in the direction of enlarging the diameter of the magnetic domain. Therefore, the magnetic domain is transformed into a shape as shown by numeral 302' in FIG. 3C. Under this state, the magnetic field produced by the dividing coil 341 is small. Upon further strengthening the magnetic field, the magnetic domain 302' is perfectly divided into two. When the magnetic domain is divided into two as illustrated in FIG. 3C, a repelling force like a magnetic dipole is exerted between the magnetic domains, and hence, these domains try to separate from each other in the downward direction. The repelling force is effective within the range about four times as large as the diameter of the cylindrical magnetic domain, if the thickness of the magnetic domain material piece and said diameter of the magnetic domain are chosen substantially equal.

Figure 3D:
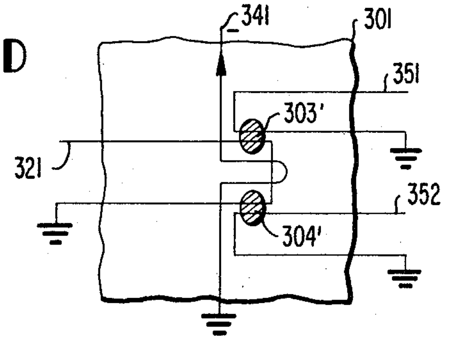
Figure 3E:
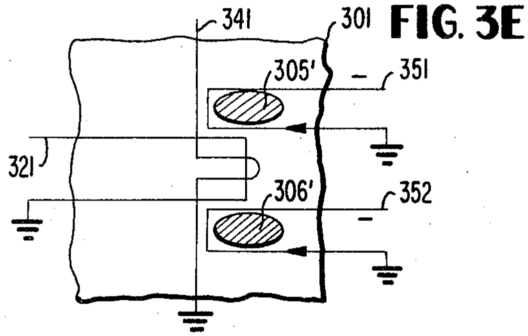
Figure 3F:
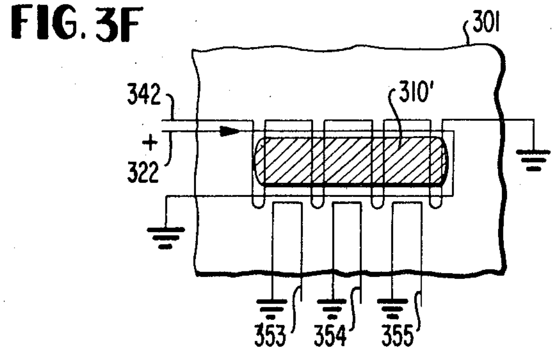
Figure 3G:
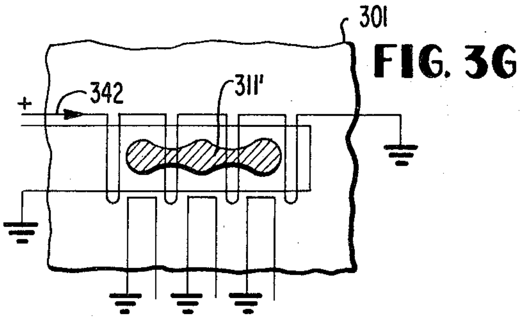
Figure 3H:
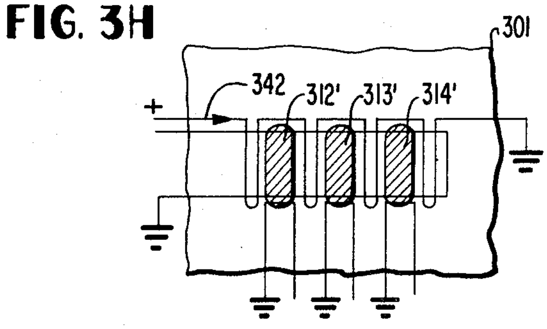
Figure 3I:
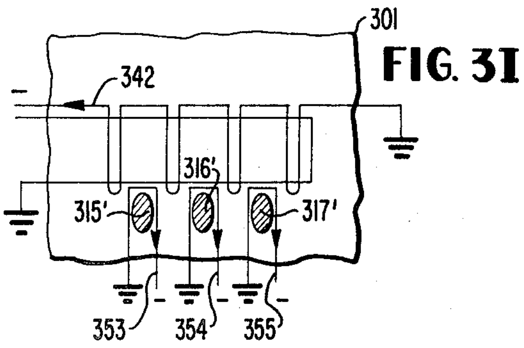

When the current through the propagation coil 321 is cut off in this state, the magnetic domains are separated from each other as shown by references 303' and 304' by the repelling force as shown in FIG. 3D, and they move into the loops of the propagation coils 351 and 352, respectively. Accordingly, when the current through the dividing coil 341 is cut off and simultaneously currents in the directions as shown in FIG. 3E are supplied to the propagation coils 351 and 352, the magnetic domains are led as 305' and 306' to the output circuit or another circuit. This fact shows that one cylindrical magnetic domain has been divided into two. If no cylindrical magnetic domain is introduced into the dividing circuit, no magnetic domain is generated at the output position. Therefore, the dividing operation (or fan-out) is, in effect, also carried out. in FIGS. 3F through 3I, one example is shown where the number of the division of the magnetic domain is large (the case where the fan-out number is large). In this example, the propagation coil for input is indicated by numberal 322, the dividing coil by numeral 342, and the propagation coils for output by numerals 353, 354 and 355. In FIG. 3F, a cylindrical magnetic domain is introduced at a position (shown by numeral 310') by the propagation coil 322. After this operation, current is caused to flow through the dividing coil 342 as shown by an arrow in FIG. 3G. While the current is small, the magnetic domain is transformed into a shape as shown by numeral 311' in FIG. 3G. Also, when the current is strengthened, the magnetic domain is divided into three as shown in FIG. 3H. More specifically, the magnetic domains are vertically enlarged, and that end part of each of the magnetic domains which is extended downwards reaches the inside of the corresponding one of the loops of the propagation coils 353, 354 and 355 connected to the output circuit (the magnetic domains are not enlarged in the lateral direction, since repelling forces are exerted and restriction is made by the dividing coil). Under this state, currents are supplied to the propagation coils 353, 354 and 355 as shown by arrows, and simultaneously, the current through the dividing coil 342 is cut off or the current in the opposite direction illustrated by an arrow is supplied thereto. Then, the magnetic domains are taken out in shapes 315', 316' and 317' into the loops of the respective propagation coils illustrated in FIG. 3I, and they are applied to the other circuit (not shown).

Thus, the cylindrical magnetic domain has been divided into three (the fan-out number is 3). In case that the number of division is more increased, the operation is carried out by the similar manner as mentioned in conjunction with FIGS. 3F to 3I.

Figure 4A:
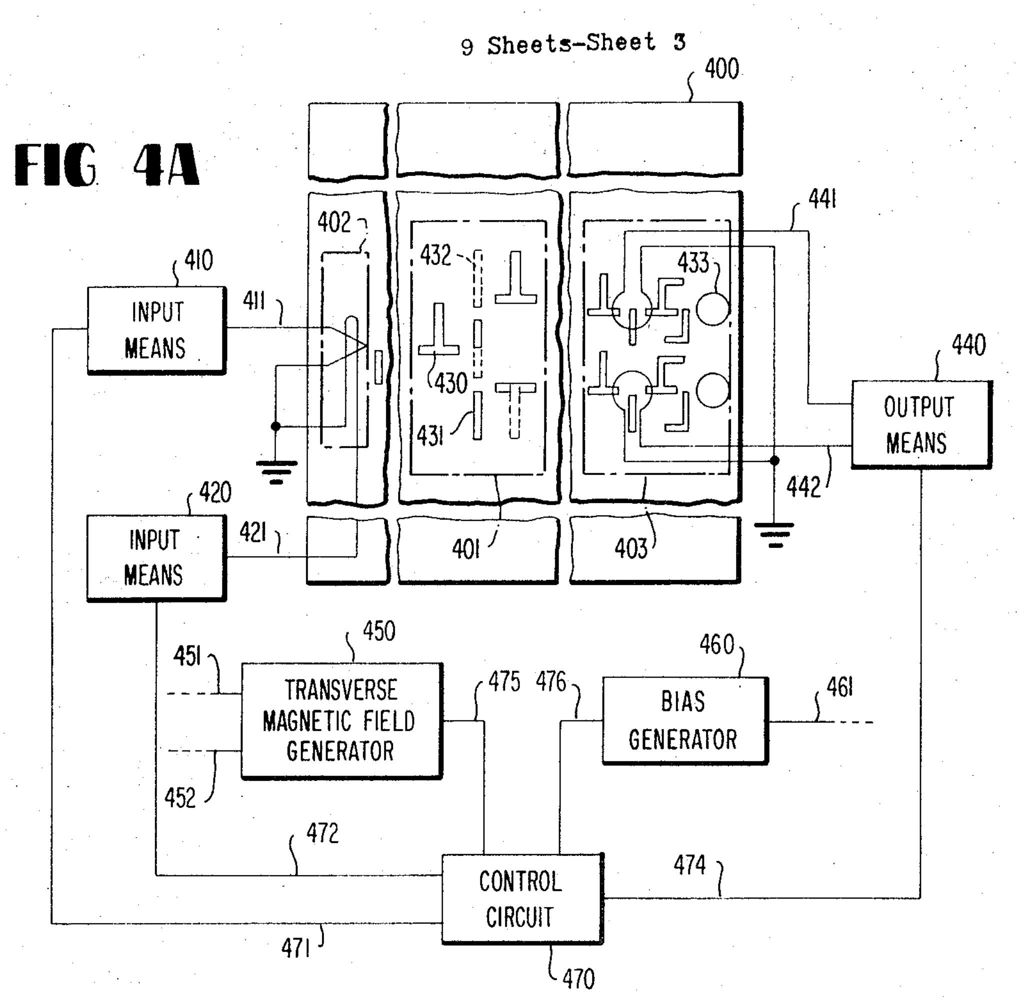
FIG. 4 shows a diagram illustrating in detail a second example of the magnetic domain dividing circuit for use in this invention.
FIGS. 4B, 4C, 4D, 4E, 4F and 4G show diagrams for explaining the operation of the dividing circuit in FIG. 4A.

FIG. 4A shows a diagram of a second example of the dividing circuit for performing quite the same operation as the circuit arrangement illustrated in FIG. 3A. In this example, however, ferromagnetic thin films such as permalloy are used instead of the conductors. For this reason, a spatial magnetic field distribution attributed to magnetic poles at ends of each thin film is utilized as driving means for the cylindrical magnetic domain. The external magnetic field is given in the form of a rotating magnetic field which varies in the plane of a magnetic material piece.

In FIG. 4A, the magnetic domain dividing means are constituted on a part 401 of a magnetic material piece 400, and ferromagnetic thin films are indicated by numerals 430, 431, 432 and 433. The magnetic field varying in the plane of the piece is obtained by the supply of current from the transverse magnetic field (a rotating magnetic field) generating unit 450 to driving coils 451 and 452 (which are omitted from the drawing for clarity thereof). The driving coils 451 and 452 are in an orthogonal relation with each other. Also, a biasing magnetic field in the orthogonal direction to the plane of the magnetic piece is obtained by the supply of a current from a biasing field generating unit 460 to a bias coil 461. The bias coil 461 is not shown in the drawing. An input circuit for introducing a cylindrical magnetic domain as a signal for the magnetic threshold circuit (including the dividing circuit 401) formed on the piece 400 is constructed on a part 402. An output circuit for taking out cylindrical magnetic domains as the result of logic operations is constructed on a part 403. The manner of the magnetic domain generating operation in the input circuit 402 is similar to one as mentioned with reference to FIG. 3A. More specifically, DC current is supplied from a DC bias power source 410 to a DC bias coil 411. In this way, the cylindrical magnetic domain is normally held. Pulse current conforming to an input signal is applied from an input signal generating unit 420 to an input coil 421. Thus, the cylindrical domain held in the bias coil 411 is divided. Moreover, the magnetic domains obtained by the dividing operation are supplied to the magnetic threshold circuit through magnetic propagation loops consisting of the magnetic thin films (as shown by numberals 430, 432 and 433) formed on the piece 400, and are calculated therein. The output circuit 403 converts the presence or absence of the cylindrical magnetic domains as the result of the calculation into electrical signals to produce outputs. More particularly, detecting coils 441 and 442 are arranged intermediate between the propagation loops. Induced voltages from the output circuit 403 which appear by the passage of the magnetic domains, are amplified, shaped and taken out by a detecting circuit 440. The DC bias power source 410, the units 420 and 460 for driving the respective coils, and the detecting circuit 440 are controlled by a control circuit 470 through conductor loops 471, 472, 476 and 474, respectively.

FIGS. 4B through 4G are diagrams of the dividing circuit 401 viewed from above. In each of these drawings, an arrow on the right side indicates the direction of the rotating magnetic field, which is rotated counterclockwise in the order of A - B - C - D - A. The shape of the thin films used herein is the so-called "T-Bar" pattern. The thin films are directly or indirectly arranged on both surfaces (upper and lower surfaces) of the magnetic material. Patterns illustrated by solid lines 430, 431, 434, 437 and 439 are arranged on the upper surface, and patterns illustrated by dotted lines 432, 435, 436 and 438 are arranged on the lower surface. Symbols *a*, *b*, *c*, and *d* of the respective thin film patterns arranged on the upper surface indicate N-pole positions which correspond to the direction of the rotating magnetic field A, B, C and D, respectively. Immediately, the symbols indicate S-pole positions which correspond to the direction of the rotating magnetic field C, D, A, and B, respectively. For instance, when the magnetic field A is established in the arrangement of FIG. 4B, the N-pole appears at the position *a* on the thin film pattern 430. When the rotating magnetic field C is established, the S-pole is produced at that position. On the other hand, symbols *a'*, *b'*, *c'* and *d'* of the respective thin film patterns arranged on the lower surface indicate N-pole positions which correspond to the direction of the rotating magnetic field C, D, A and B, respectively, and simultaneously, the symbols indicate S-pole positions which correspond to the direction of the rotating magnetic field A, B, C and D, respectively. For example, when the rotating magentic field is in the direction of C in the arrangement of FIG. 4D, the S-pole is generated at the position *c'* on the pattern 436. However, the N-pole at the thin films on the upper surface and the S-pole at the thin films on the lower surface perform an identical action for the cylindrical magnetic domain. As a result, it is quite unnecessary to distinguish *a* and *a'*, *b* and *b'*, *c* and *c'*, and *d* and *d'* with respect to the operation.

The magnetic domain dividing operation of this circuitry is quite similar to the operation which has been explained with reference to FIGS. 3B through 3E. In addition, the biasing magnetic field in the direction of the thickness of the piece 401 is assumed to be applied, as shown in FIGS. 3A through 3I, from the back towards the face of the paper. Accordingly, the magnetization of the cylindrical magnetic domain is directed from the face towards the back of the paper. If the rotating magentic field is at the position A in FIG. 4B, the N-pole is then generated at an input position, that is, the position *a* of the pattern 430. Therefore, the domain generating the S-pole on the face of the paper is attracted to this position. For this reason, if the magnetic domain is led to this input position from a suitable propagation circuit composed of a thin-film pattern, it is held as indicated by numeral 401′, although not shown in the drawing. Next, when the rotating magnetic field moves from the position A to B, the position of the N-pole on the thin film pattern 430 moves from the position *a* in FIG. 4B to the position *b* in FIG. 4C. In this case, the magnetic domain 401′ moves to 402′ as it is attracted by the N-pole. At the position C at which the rotating field has been rotated by a further one-fourth cycle, the N-pole on the pattern 430 moves to the position c, and the S-pole on the pattern 436 arranged on the back is generated at the position *c*′ as shown in FIG. 4D. Therefore, both the poles attract the cylindrical magnetic domain. As a result, the state of the cylindrical magnetization at a branch point (the vicinity on a line connecting between *c* and *c*′) becomes as shown by numberal 403′ in FIG. 4D such that the diameter of the magnetic domain is increased since the resultant magnetic field due to the magnetic poles at the positions *c* and *c*′ is applied to the magnetic domain. At a position E of the rotating magnetic field slightly after the position C, the position of the N-pole on the pattern 434 appears at *e*, and the position of the S-pole on the thin film pattern 435 appears at *e*′ in FIG. 4E. As a result, the magnetic domain 403′ is attracted by these pole positions, and is elongated in the downward direction as shown in FIG. 4E. At this time, since the magnetization in the direction opposite to the magnetic domain is generated in the vicinity of the branch point (in FIG. 4E, the end of the pattern 434 which is remote from *e*), the diameter of the magnetic domain is decreased and is transformed into a shape of dumbbell as shown by numeral 404′. As the rotating field is further rotated to come closer to the position D, The opposite magnetization in the vicinity of the branch point is increased more. For this reason, the diameter of the domain is further reduced, finally to disappear and to divide said magnetic domain into two. Under the condition, directly after the divisional operation has been carried out, the repelling force is exerted between two magnetic domains. Therefore, the two domains cannot come close to each other. In FIG. 4F which shows the state of the magnetic domains at the position D, the N-pole is generated at the position *d* on the patterns 434 and 431, and S-pole is generated at the possition *d*′ on the patterns 435 and 432. Immediately after the division of the magnetic domain, however, the repelling force between the magnetic domains is exerted at the position *d* on the pattern 434 and at the position *d*′ on the pattern 435. Therefore, the domains cannot stay at the positions, and are settled at the position *d*′ on the pattern 432 and the position *d* on the pattern 431 after the movement in the downward direction (between these positions, there is no effect of the repelling force). When the rotating magnetic field is brought to the position C at the time point where it has been rotated by further three-fourths cycle, the magnetic domains are moved from the positions of FIG. 4F to positions shown by numerals 407′ and 408′ in FIG. 4G. In this case, in correspondence with the respective positions, the N-pole position moves rightward as shown *a* - *b* - *c* on the pattern 439, and the magnetic pole position similarly moves rightward as shown by *a* - *b*′ - *c* on the patterns 437 and 438. The magnetic domains move in accordance with the movements of the magnetic poles.

Figure 4B:
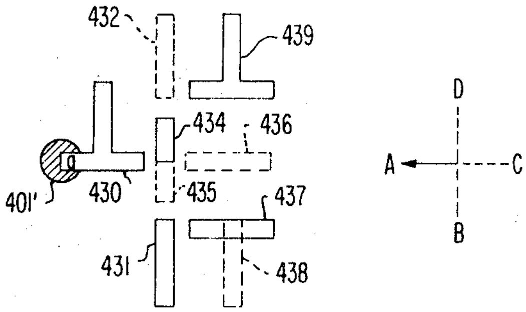
Figure 4C:
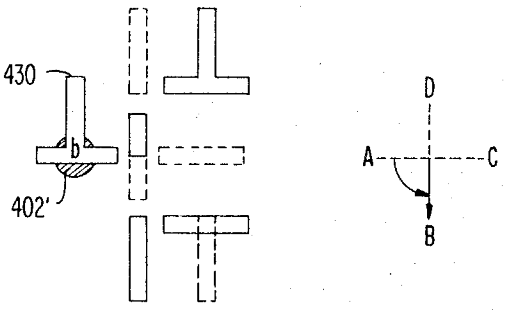
Figure 4D:
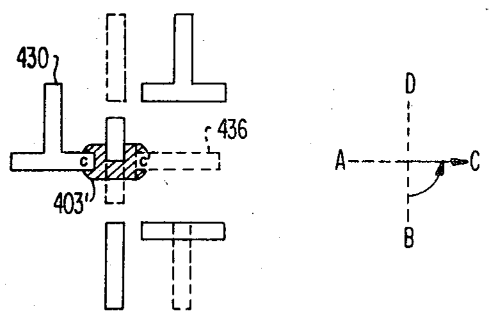
Figure 4E:
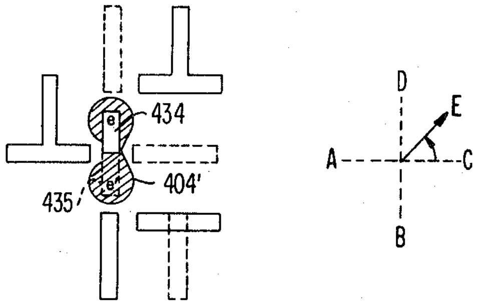
Figure 4F:
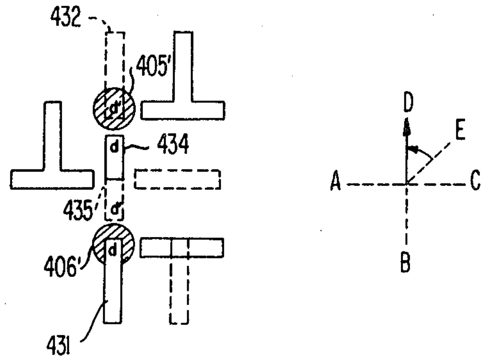
Figure 4G:
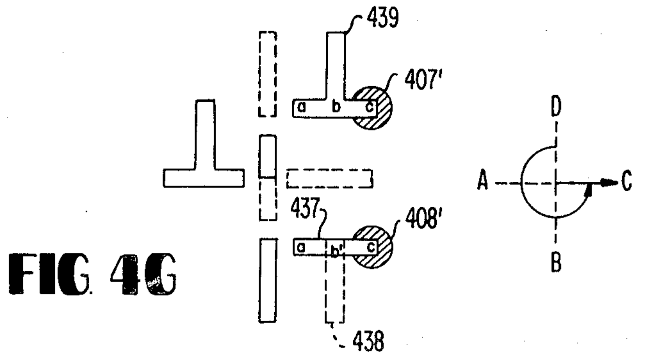

In summary, the magnetic domain entering into the dividing circuit in FIG. 4B produces, after the lapse of 1½ cycles of the rotating field, outputs divided into two as shown in FIG. 4G. If no magnetic domain is received at the input, no magnetic domain is produced at the outputs. Thus, the magnetic domain dividing operation is performed in FIGS. 4A through 4G. In the example of FIG. 4, the explanation is given for a dividing means of weight 2 (the fan-out number). However, the same type of circuit example may be used to provide a higher weight or division number.

FIGS. 5A through 5D show a third example of a magnetic domain dividing circuit. This circuit is more flexible because the number of divisions (the fan-out number) may be optionally changed. When the division number may be optionally changed in this manner, the circuit is effective for use in pattern recognition apparatus such as a learning machine.

The dividing circuit in FIGS. 5A through 5D is composed of a magnetic material piece 501, thin film patterns 520, 521, 522 and 533 of the so-called Y-Bar type, and a fan-out conductor loop 510. Other parts of the circuit are omitted from the drawings. In each drawing, the direction of the rotating magnetic field at each time is indicated on the right-hand end. A biasing magnetic field applied to the piece 501 is directed from the face to the back of the paper, and accordingly, the magnetic field of the cylindrical magnetic domain is directed from the back to the face of the paper. The patterns 520, 521, ..., and 533 are mounted on the upper surface of the piece 501. Moreover, the conductor loop 510 is arranged on the upper surface (or on the lower surface of the piece 501). Symbols a, b anc c on the patterns 520, 521, ...., and 533 show N-pole positions which are generated at time positions of the rotating magnetic field, respectively, and the magnetic domains can stay at the N-pole positions. Since these relations have been already mentioned in detail in the description with reference to FIGS. 4B through 4G, further detailed explanation will not be given. One difference from the case of FIGS. 4B through 4G is that in this example the rotating magnetic field is rotated clockwise in the order of A - B - C, etc.

Figure 5C:
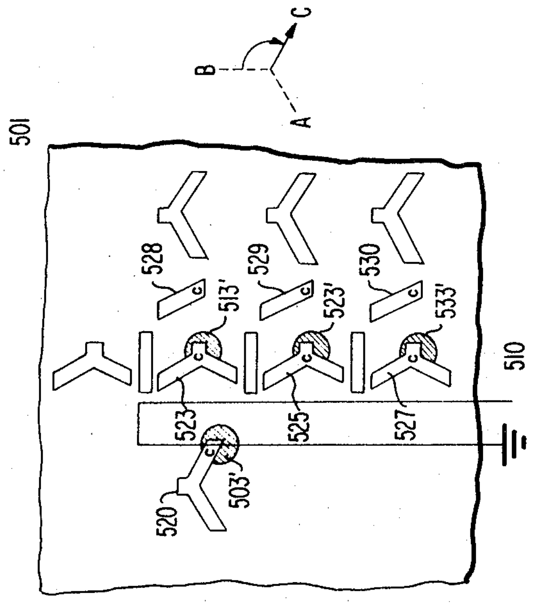
FIGS. 5A, 5B, 5C and 5D show diagrams for explaining the operation of a third example of the magnetic domain dividing circuit used in this invention.
Figure 5D:
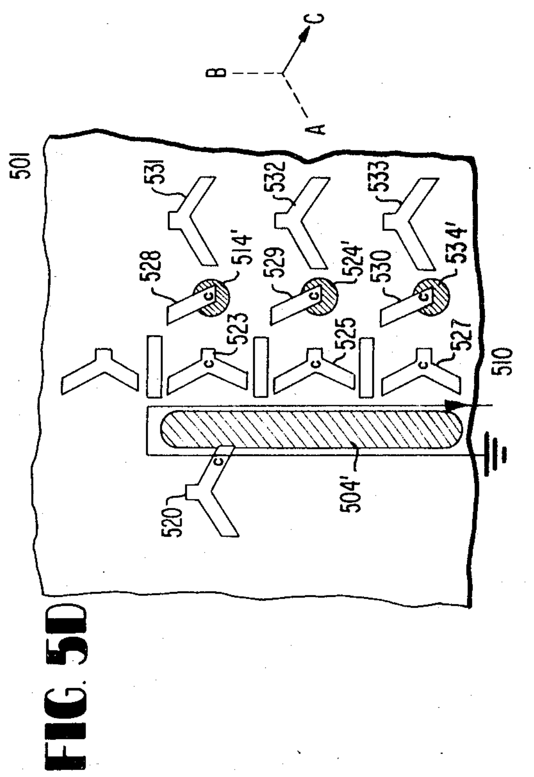
Figure 5A:
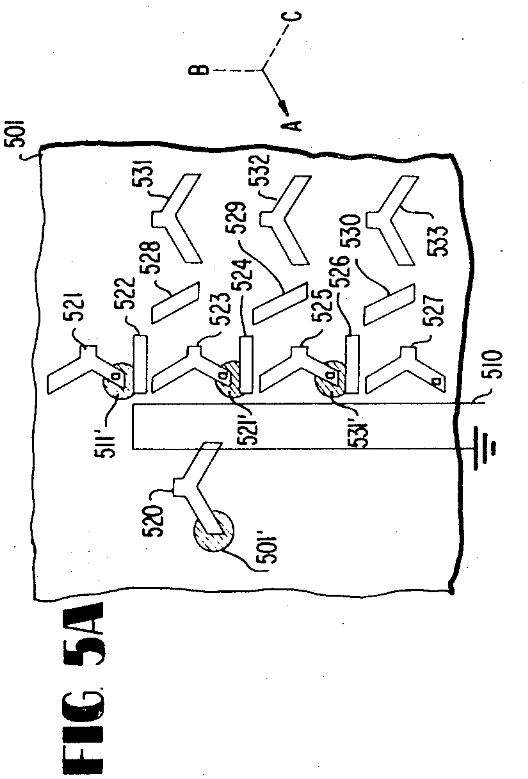
Figure 5B:
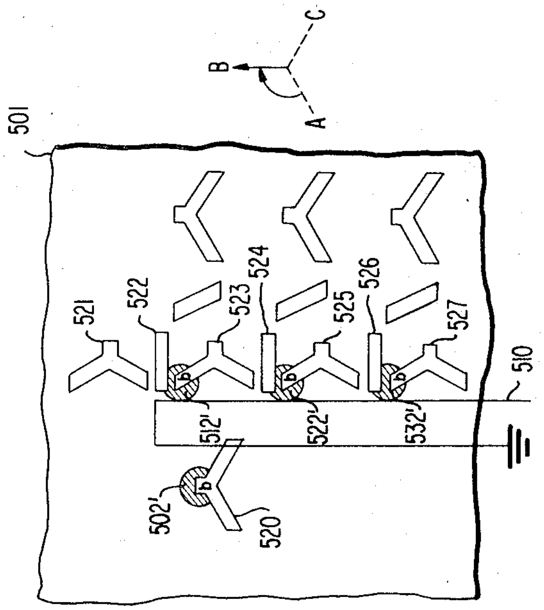

In FIG. 5A, an input section is capable of introducting a cylindrical magnetic domain at the position a of the pattern 520 at the position A of the rotating field. The patterns 531, 532 and 533 are output sections of this circuitry, and magnetic domains corresponding to the number of division are taken out on the right side. The patterns 521, 522, 523, 524, 525 and 527 comprise a circuit defining the divisional (fan-out) number, and constitute thin film loops for propagating the magnetic domain from the upper to the lower. A number of magnetic domains corresponding to the division number are entered initially by a conventional technique one by one from the upper end of the pattern 521. In the drawing, three magnetic domains are entered (from the fact that 3 has been designted as the fan-out number). These three domains are entered irrespective of the input to the divider. The input only determines whether said three domains will appear at the output locations of the divider. At the position A of the rotating field, the magnetic domains are moved downward on the patterns 521, 523 and 525, and stay at the positions *a*, respectively. This state is illustrated by magnetic domains 511', 521' and 531'. If a magnetic domain 501' is introduced at the position *a* of the pattern 520, the domain at the input section moves to the position *b* on the pattern 520 (as shown by numeral 502' in FIG. 5B) upon rotation of the rotating field by one-third cycle from A to B. Simultaneously, the magnetic domains 511', 521' and 531' on the patterns 521, 523 and 525 are respectively moved through the patterns 522, 524 and 526 to the positions *b* on the patterns 523, 525 and 527, or in other words, to numerals 512', 522' and 532'. When the rotating field is further rotated by one-third cycle from this state to the position C, the domains 502', 512', 522' and 532' are respectively moved to the positions c on the patterns 520, 523, 525 and 527, or in other words, to numerals 503', 513', 523' and 533' as shown in FIG. 5C. Although the N-pole is also generated at the positions *c* of thin film patterns 528, 529 and 530, no magnetic domain is moved to these positions. At this time current is applied to the fan-out conductor loop 510 as indicated by an arrow in FIG. 5D, and the diameter of the domain 503' at the position *c* on the pattern 520 is enlarged within the loop by the magnetic field due to the conductor loop current and becomes as shown at numeral 504'. At the same time, a repelling force is exerted between the enlarge domain and magnetic domains 513', 523' and 533' at the respective positions *c* on the patterns 523, 525 and 527. For this reason, the domains 513', 523' and 533' skip rightward to transfer to the respective positions *c* on the patterns 528, 529 and 530 or, in other words, to 514', 524' and 534'. If no magnetic domain is introduced into the input section in FIG. 5A, the magnetic domain 504' enlarged within the loop 510 is not present in the state of FIG. 5D. Therefore, the magnetic domains at the respective positions *c* on the pattersn 523, 525 and 527 are left as they are, and no magnetic domain is moved to the position *c* on each pattern 528, 529 and 530. That is, the presence or absence of the magnetic domain led into the input section is multiplied by the fan-out number to be derived at the output positions. In FIGS. 5A through 5D, the description is given for the case where the fan-out number is 3. However, a different fan-out number may be obtained by inserting a different number of mangetic domains from the upper end of the pattern 521. The structure of the threshold logic circuit using such dividing circuit becomes simple to permit its standardization, and its control becomes simple.

Figure 6A:
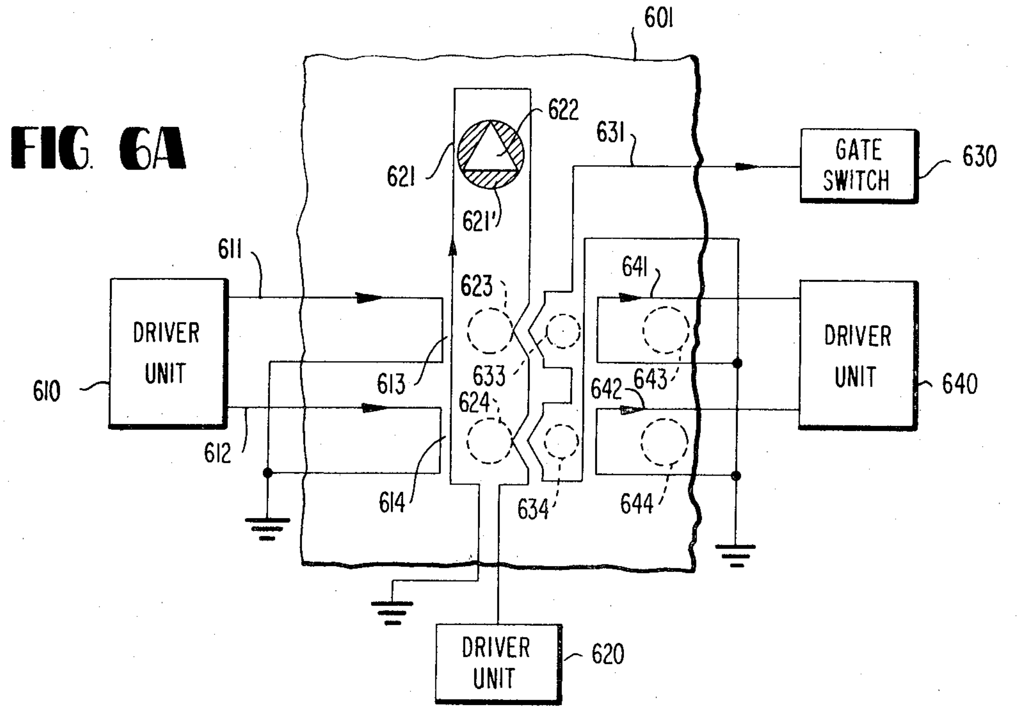
FIG. 6A shows a diagram of a first example of magnetic domain arrangement and gate circuits for use in this invention.
Figure 6B:
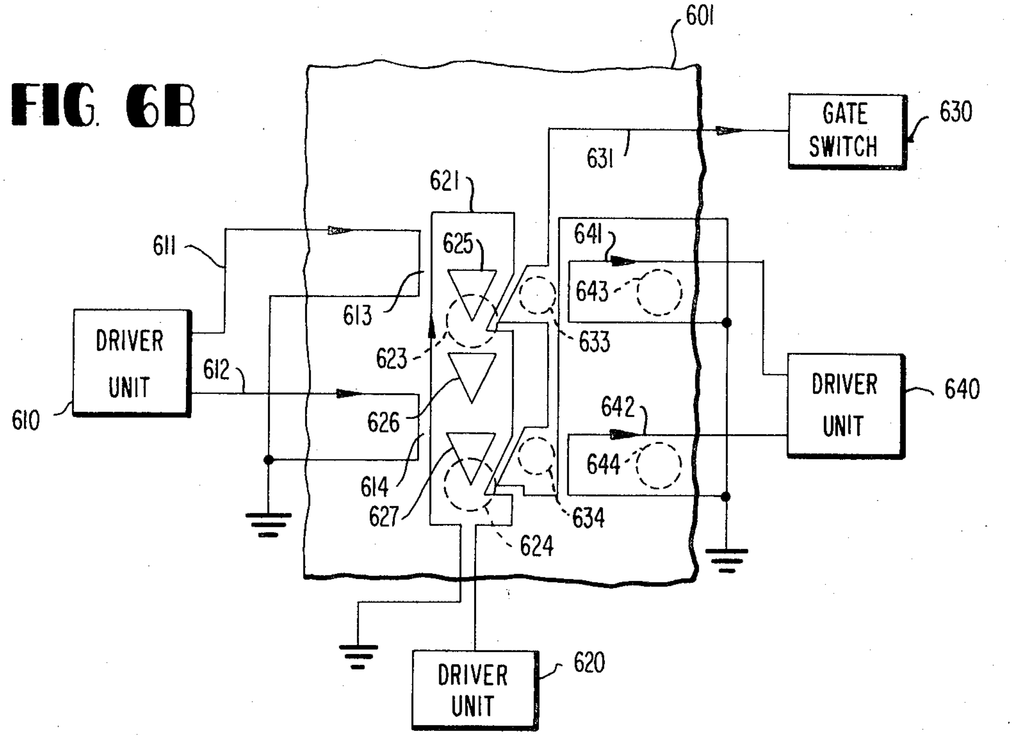
FIG. 6B shows a diagram of a second example of the magnetic domain arrangement and gate circuits of this invention.

FIGS. 6A and 6B show two examples of the magnetic domain arrangement and gate circuits composed of conductor patterns. In these examples, the input number and the output number are assumed to be 2.

In these drawings, only the parts of the arrangement circuit and the gate circuit are illustrated, while other constituent parts of the threshold circuit are not shown. Conductor loops and thin film patterns are formed on the upper surface of a magnetic domain material piece 601. However, the direction of the biasing magnetic field, the relation between the direction of a current through the conductor loop and the cylindrical magnetic domain and so forth are the same as those mentioned in the description of FIGS. 5A through 5D (The bias supply means is omitted from the drawings).

Referring to FIG. 6A, a cylindrical magnetic domain from a generating section (not shown) is applied to this circuit by the supply of currents from a driver unit 610 to propagation loops 611 and 612 as shown by arrows. When used as part of the overall threshold logic circuit described herein, the magnetic domains would be transferred from the divider means to the arrangement means, with loops 611 and 612 corresponding to transfer means. It is now assumed that the magnetic domain is applied to only one conductor loop 611 and that it is not applied to the other loop 612. The magnetic domain in the loop 611 is enlarged by the magntic field due to the current generated in the direction of the arrow of loop, and it reaches a boundary part 613 of an arrangement loop 621 when the curret is cut off. Next, when a current is caused to flow through the loop 621 in the direction of an arrow, the magnetic domain moves to an arrangement position 623 within the loop 621. A cylindrical magnetic domain 621' attached to a thin film pattern 622 has been previously placed in the loop 621 by known techniques. The diameter of the magnetic domain 621' is enlarged downward in the arrangement loop by the magnetic field generated owing to the arrangement loop magnetic current, and the domain 621' comes close to the domain at the position 623. A repelling force is exerted between both the magnetic domains so that they try to move apart. However, because the upper part of the magnetic domain which has been elongated downwardly is fixed by the pattern 622 and the loop 621, it has no means for escape. On the other hand, the magnetic domain at the position 623 moves downwards by the repelling force, since the downward space is vacant. As a result, the domain goes to another arrangement position 624 (this position is vacant since no magnetic domain has been introduced into the loop 612) to become stationary. When the current of the loop 621 is cut off in this sate, the magnetic domain elongated downward is returned toward the upper part where the pattern 622 exists, and moves to the pattern 622 to become stationary. On the other hand, the magnetic domain at the position 624 stays at that position. Thus, the sequential operation of arranging magnetic domains from the bottom is completed. An arrangement loop driving unit 620 is used as means for supplying current to the loop 621.

When the current supplied from the gate switch 630 is caused to flow through the gate conductor loop 631 in the direction of an arrow, the magnetic domain at the arranged position 624 within the loop 621 is moved rightward to a position 634. Furthermore, when the current of the gate loop 631 is cut off and simultaneously, currents are applied to conductor loops 641 and 642 from a driving unit 640, the magnetic domain is moved to an output position 644 to be read out by means hereinafter described. Since only one magnetic domain was applied to the arrangement circuit, no magnetic domain appears at an output position 643.

In the case where the magnetic domain is applied only to one of the loops 611 and 612, the single magnetic domain is obtained finally at the position 644 via the position 624 by supplying the currents to the conductor loops in the order as mentioned above.

In the case where magnetic domains entering into the conductor loops 611 and 612 at the same time, the magnetic domain 621' stuck to the pattern 622 is enlarged downward within the loop 621 due to the magnetic field generated by the current of the loop, and magnetic domains at the positions 623 and 624 which were transferred from the loops 611 and 612 are compressed downward. However, by the repelling force between the latter two domains, they are balanced. In addition when the current of the loop 621 is cut off, the domains are returned to and arranged at the original positions 623 and 624, respectively. The distance between the positions 623 and 624 is set to the extent that the repelling force does not affect the domains when they are in those respective positions. Under the stationary bias magnetic field, the magnetic domains cannot come closer than the distance shown. Accordingly, the magnetic domains from the positions 623 and 624 are read out at the output positions by sequentially driving a gate conductor loop 633 and the conductor loops 641 and 642. In this manner, the magnetic domains are arranged one by one from the lower one of the arranged positions 623 and 624 within the loop 621 (herein, in the order of the positions 624 through 623) independent of the presence and absence of the magnetic domains which are applied to the loops 611 and 612. Then, the magnetic domains are gated by the magnetic field generated owing to the current of the loop 631 and led to the output position 643 and 644. The conductor loops 611, 612, 641 and 642 are all used for moving the magnetic domains, and the loop 631 controls the movement of the information to the output positions. The output positions correspond to threshold values. Output position 643 corresponds to an upper limit threshold of 2 ($t_1 = 2$) and a lower limit threshold of 1 ($t_2 = 1$). Output position 644 corresponds to an upper limit threshold of 1 ($t_1 = 1$) and a lower limit threshold of 0 ($t_2 = 0$). Accordingly, assuming that a signal applied to the loop 611 is the input A and that a signal applied to the loop 612 is B, the logic functions of $[A + B]_{2,1}$, or A·B, and $[A + B]_{1,0}$, or $A \oplus B$ are obtained from the output positions 643 and 644, respectively, within the conductor loops 641 and 642 corresponding to the outputs. In this example, the gate circuit consisting of the gate conductor loop 631 is commonly used for the read-out operation from the arrangement positions to the output positions. However, it is also possible to construct separate gate circuits and to selectively read out the information.

In FIG. 6B which shows the second example of the magnetic domain arrangement circuit, only the structure within the magnetic domain arrangement conductor loop is different from that in FIG. 6A and the other parts are almost the same. Therefore, these other parts will not be explained again. The arrangement circuit in this example is constructed with the formation of thin film patterns of the so-called angel-fish-type. The operation of arranging magnetic domains is not performed in parallel as explained with respect to FIG. 6A, but it is carried out in series. Therefore, several cycles are required to complete the arrangement, and the gate circuit for example, is operated to open after completion of a number of cycles equal to the number of possible inputs (that is, the number of arrangement positions). Like numerals are given to like constitutents shown in FIG. 6A.

When a cylindrical magnetic domain is led to the conductor loop 611 as an input signal, it reaches the input position 613 which becomes the entrance to the arrangement conductor loop 621 when the loop current is cut off. Next, when current is caused to flow through the loop 621 as indicated by an arrow and is then cut off, the magnetic domain moves from the input position 613 to the arrangement position 623 attached to a thin film pattern 625 within the arrangement loop. Assuming that no magnetic domain has been applied to the other conductor loop 612, no magnetic domain is produced at the input position 614 and at the arrangement position 624 stuck to a thin film pattern 627 within the arrangement loop. When the loop current of the arrangement conductor loop is subsequently increased in the direction of an arrow, the magnetic domain at the position 623 is enlarged in diameter and is elongated downward (the upper part of the domain is restricted by the arrangement loop) to arrive at a thin film pattern 626. When, at this moment, the loop current is decreased to zero and is then increased in the direction opposite to an arrow direction, the magnetic domain is reduced. Thus, the position where it stays is shifted from the pattern 625 to 626. This comes from the fact that, between the wedge-shaped patterns 625 and 626, the movement of the magnetic domain at the time of the decrease in the arrangement loop current (at the time of the reduction of the magnetic domain) is simpler in the direction from the former to the latter (downward in the drawing) than in that from the latter to the former (upward in the drawing), and that the movement is based on the so-called "worm motion." Since the detailed operation of the worm motion is described in the above-mentioned reference "IEEE TRANSACTIONS ON MAGNETIC" Vol. 5, No.3, September issue, 1969, pp. 544 to 553, no additional description will be given herein.

When the current through the arrangement conductor loop is again modulated in the positive and negative polarities, the magnetic domain moves by the same worm motion, from the pattern 626 and reaches pattern 627 (more precisely, it reaches the arrangement position 624 attached to 627) to complete the magnetic domain arranging operation. If the magnetic domain is not introduced into the loop 611 but only into the loop 612, the magnetic domain at the time of the completion of the arrangement operation is also obtained at the lowest position 624, and no magnetic domain is present at the second-lowest position 623. If magnetic domains are simultaneously inserted into the loops 611 and 612, they are obtained at both the positions 623 and 624, respectively. In this case, however, the two magnetic domains are left arranged at the respective positions 623 and 624 without altering the positions thereof, to complete the arrangement operation of the magnetic domains, since dimensions are determined such that even if the modulation current is caused to flow through the arrangement conductor loop to effect the worm motion, the magnetic domains cannot come closer than the distance between the positions 623 and 624 on account of the repelling force between the magnetic domains. The read-out operation of the magnetic domains to the output position 643 or 644 is carried out in quite similar manner to the operation in FIG. 6A. Namely, the read-out operation is performed by driving the gate conductor loop 631 and the conductor loop 641 or 642. As the thin film patterns 625, 626 and 627 used herein, only the wedge-shaped "angel-fish" type has been illustrated. However, any type of other suitable shape may be employed if it effects a similar operation. In common with the examples in FIGS. 6A and 6B, a suitable magnetic keeper is needed for stable operation of the circuitry, for instance, a circular and minute thin film pattern which keeps the magnetic domain within the conductor loop. However, such elements are omitted from the drawings.

Figure 7C:
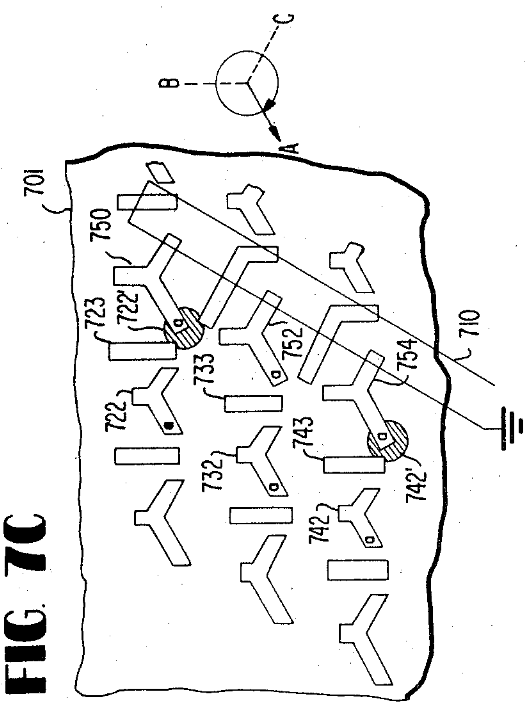
FIGS. 7A, 7B, 7C, 7D, 7E, 7F, 7G and 7H show diagrams of a third example of the magnetic domain arrangement and gate circuits for use in this invention.
Figure 7D:
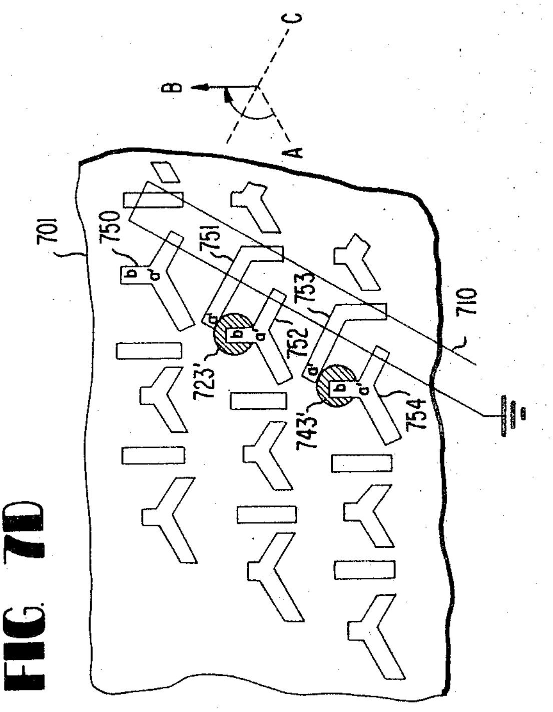
Figure 7A:
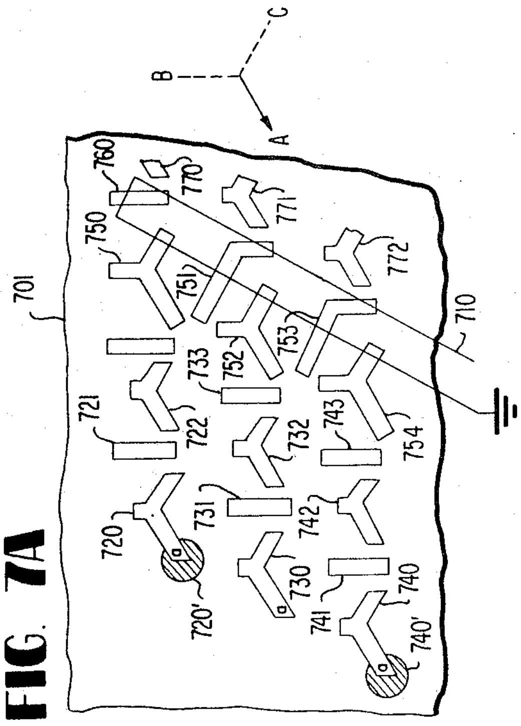
Figure 7B:
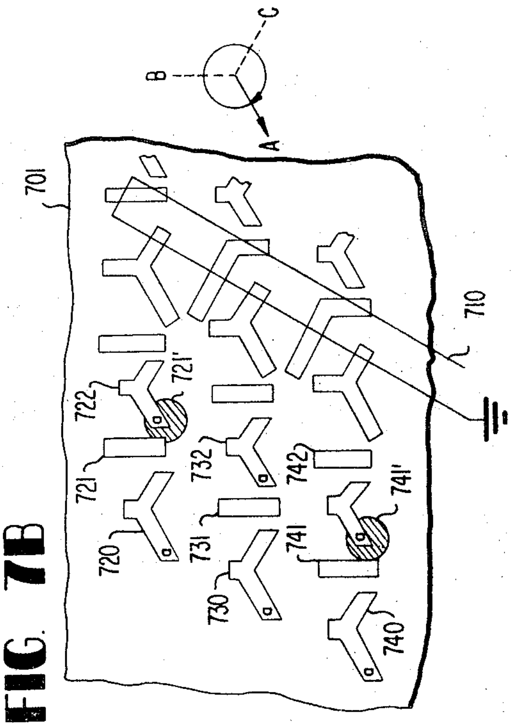
Figure 7G:
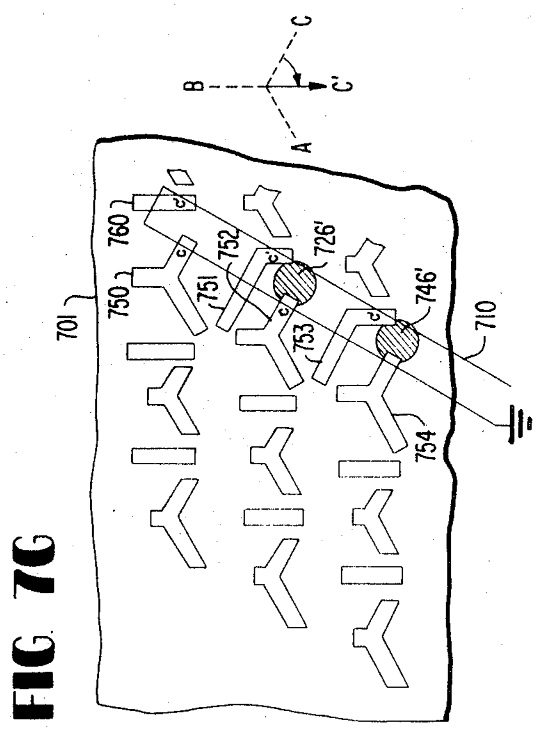
Figure 7H:
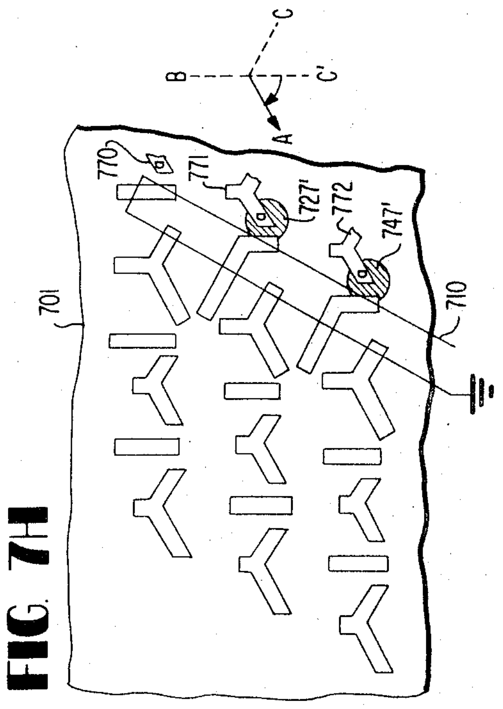
Figure 7E:
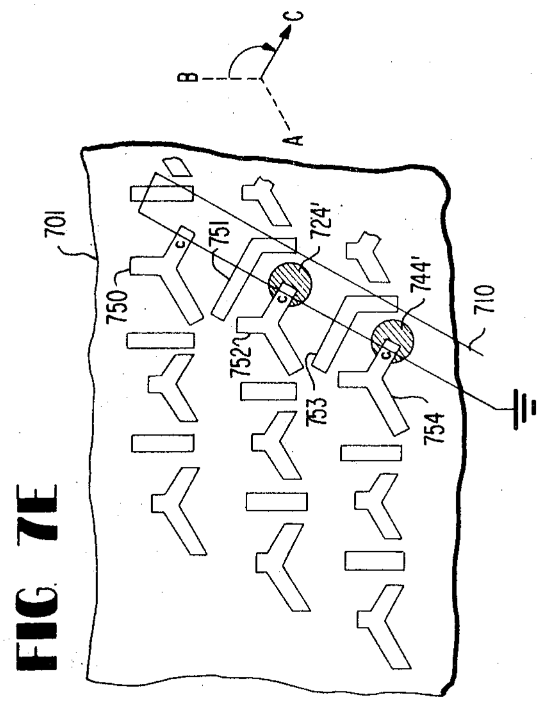
Figure 7F:
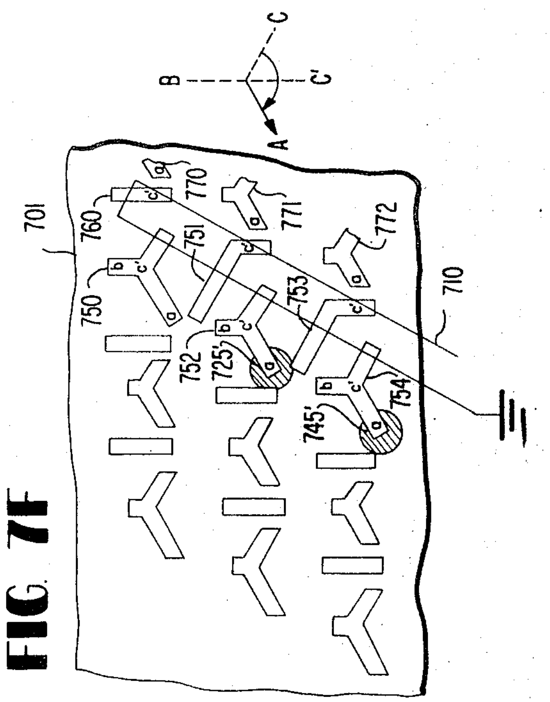

FIGS. 7A through 7H show the third example of the magnetic domain arrangement and gate circuits for performing similar operations to those in FIGS. 6A and 6B. In FIGS. 7A through 7H, the Y-bar thin film patterns similar to those in FIGS. 5A through 5D are used for the propagation and arrangement of magnetic domains. In each of FIGS. 7A through 7H, the direction of the rotating magnetic field at each time position is indicated on the right-hand side of the drawings. Thin film patterns 720, 721, ....., 723, 730, 731, ....., 733, 740, 741, ....., 743, 750, 751, ....., 754, 760, 770, 771 and 772 and a gate conductor loop 710 are arranged on the face of a magnetic material piece 701 (the face of the sheet of the drawing). Also, a bias magnetic field is applied in the direction from the face to the back of the drawing sheet. Therefore, the magnetization direction of a magnetic domain is opposite to the direction of the bias magnetic field. The patterns 720, 721, ....., 723, 730, 731, ....., 733, 740, 741, ....., and 743 serve as input propagation loops connected to the magnetic domain arrangement circuit structured by the patterns 750, 751, ....., and 754, respectively. The patterns 750, 751, ....., and 754 constitute the arrangement circuit which performs the arrangement operation in serial manner in the order from the bottom (in the order of 754, 753, ....., 750). Propagation loops connected to the outputs are composed of the patterns 760 and 770, 751 and 771, 753 and 772 which are located on the right-hand side of the arrangement circuit. The bridgement between the arrangement circuit and the propagation loops is carried out by the supply of current to the loop 710 and by the utilization of a magnetic field thereby obtained. The circuit shown in FIG. 7 is an arrangement circuit of 3 inputs - 3 outputs. It is now assumed that, at the time position A of the rotating field, cylindrical magnetic domains 720′ and 740′ are introduced into the patterns 720 and 740, respectively, and that no domain is introduced into the pattern 730. This state is shown in FIG. 7A. Next, when the rotating magnetic field is rotated clockwise by one cycle in the order of A - B - C - A, the magnetic domains 720′ and 740′ at positions *a* on the patterns 720 and 740 are moved rightward by one bit position, respectively. For this reason, the domains 720′ and 740′ reach the positions a on the patterns 722 and 742. Thus, they are brought to positions shown by magnetic domains 721′ and 741′ as shown in FIG. 7B, respectively. The state after one further cycle of rotation of the rotating field is shown in FIG. 7C. The respective magnetic domains reach positions *a* of the thin film patterns 750 and 754 of the arrangement circuit (the magnetic domains are indicated by 722′ and 742′). FIG. 7D illustrates the state of the magnetic domains at the time position B where the rotating field is rotated by one-third cycle from the state of FIG. 7C. The magnetic domain 722′ at the position *a* of the pattern 750 passes through a position *a′* on the pattern 751 and moves to a position *b* of the pattern 752, while the magnetic domain 742′ at the position *a* on the pattern 754 is settled at the position *b* on the same pattern. In this operation, there are two positions to which the magnetic domain 722′ at the position *a* of the pattern 750 can move at time position A′, or in other words, a position *a′* on the pattern 750 and the position *a′* on the pattern 751. The latter is shorter in distance, and the magnetic domain can easily move thereto. Hence, at the position B of the rotating field, the magnetic domain is moved to become a magnetic domain 723′. As regards the patterns 752 and 753, a similar relation can be applied in case where no magnetic domain exists on the pattern 754. On the other hand, for the magnetic domain at the position a on the pattern 754, the place to go at time position A′ is only one, the position *a′* on the same pattern. Therefore the domain necessarily moves to this position, and goes to the position *b* on the same pattern at the next time position B. The case where the rotating magnetic field is rotated from B to C by further one-third cycle is shown in FIG. 7E. When, thereafter, the rotating field is rotated by further one-third cycle to the time position A, magnetic domains 724′ and 744′ are respectively moved to the positions *a* on the patterns 752 and 754 to be brought to positions as shown by magnetic domains 725′ and 745′ in FIG. 7F. Also, in the operation at this time, as shwon in the previous description (FIGS. 7C through 7D), the magnetic domain has two places-to-go at a time position C′ in the course of from the time position C to the time position A (for the magnetic domain 724′, a position *c′* on the pattern 752 and a position *c′* on the pattern 751). However, this arrangement circuit is constructed such that the magnetic domain will not go from the arrangement circuit to the output propagation loop unless the gate conductor loop is used. As a result, all the magnetic domains determine their places-to-go on the arrangement circuit. Accordingly, the resultant state at the time point A is shown in FIG. 7F. When the rotating field is rotated from the state of FIG. 7F by further one-third cycle to the time position B (although not shown, the same as FIG. 7D), a magnetic domain 725′ ought to be moved to the position *b* on the pattern 754 according to the previous description. Herein, however, the magnetic domain 745′ also intends to move toward the same position. Therefore, a repelling force is exerted between the magnetic domains, and they cannot come closer to each other. The domain 725′ is settled at the position *b* of the pattern 752, which is the other place-to-go. On the other hand, the magnetic domain 745′ has only one place-to-go, and hence, goes to the position *b* on the pattern 754. Such operation occurs as a result of the fact that the magnetic domains have been packed in the order from the bottom in the arrangement circuit. In addition, the arrangement operation has been brought to this state, and the two magnetic domains which have entered the input positions (the positions a of the patterns 720, 730 and 740) are arranged in the order from the bottom in the arrangement circuit. For this reason, even if the rotating field is rotated by any number of cycles, the arrangement is never destroyed without opening the gate conductor loop. The operation for reading out the operation result or arrangement result to the output propagation loops, is carried out in such a way that while the rotating field moves from the time point C to A, current is caused to flow through the gate conductor loop in the arrow direction as shown in FIG. 7G, thereby to change the propagation paths of the magnetic domains.

FIG. 7H shows the state of the magnetic domains at the time point following the gating operation. Assuming that the signals which enter into the input propagation loops 720, 730 and 740 are A, B and C, respectively, the respective patterns 750, 752 and 754 in the magnetic domain arranging section are assigned, in the order from the bottom, with such arrangement positions that the upper and lower limits of the threshold values are $t_1$, $t_2$ = 1, 0; 2, 1; and 3, 2 respectively. Therefore, when the gate conductor loop 712 is driven, logic outputs of the logic functions of $[A + B + C]_{1,0}$ $_{24}$ $[A + B + C]_{2,1}$ and $[A + B + C]_{3,2}'$ that is to say $A \oplus B \oplus C$, $A \cdot B \oplus B \cdot C \oplus C \cdot A$ and $A \cdot B \cdot C$ are obtained from the output propagation loops 770, 771 and 772, in the order from the bottom (in the order of 772, 771 and 770), respectively. In this example, the magnetic domains have been led into the input propagation loops 720 and 740, and not into 730. Consequently, as A + C + 1 and B + 0, in the order from the bottom $[1 = 0 = 1]_{1,0} = 1$, $[1 + 0 + 1]_{2,1} = 1$ and $[1 + 0 + 1]_{3,2} = 0$, namely, 1, 1 and 0, which realize the logic functions $A \oplus B \oplus C$, $A \cdot B \oplus B \cdot C \oplus C \cdot A$ and $A \cdot B \cdot C$, are obtained from the output propagation loops, respectively. When the magnetic domains are led into all the patterns 720, 730 and 740 in the input section, the respective magnetic domains reach the positions a of the patterns 750, 752 and 754 in the arrangement section after two cycles of the rotating magnetic field. At the time point A' after the next one-sixth cycle of the rotation, although the magnetic domains on the patterns 754 and 752 intend to move in the connecting direction, they cannot come closer to each other because of the repelling force and are respectively held on the patterns where they occupy. A similar operation is also repeated between the magnetic domains on the patterns 752 and 750. Finally, the upward shift of the magnetic domains (in the order of 750, 752 and 754) is not caused. At the time point B after the next one-sixth cycle, the domains reach the time points b on the respective patterns. At any subsequent time point of the rotating field, the domains remain held on the respective patterns as they are. Accordingly, outputs 1, 1 and 1 are read out at the output propagation loops 770, 771 and 772, respectively, by opening the loop 710. In this respect, the operation from the arrangement to the opening of the loop is completed in one cycle. However, in the worst case or, if the magnetic domain is introduced into only the input pattern 720 and not into the remaining input patterns 730 and 740, it takes a long time for the magnetic domain to move from the pattern 750 through the pattern 752 to the pattern 754, with the result that two cycles are required. Thus, if the gate conductor loop is opened two subsequent cycles of the magnetic field (after the magnetic domain or domains have entered the arrangement section) for any signals from the input, the desired logic outputs are read out. The operation in case of other input signals is similar, and no additional description will be given, In the example of FIGS. 7A through 7H, the loop 710 is commonly used for the respective output propagation loops. It is also possible to separately construct such gate loops and to selectively drive them for use. The thin film patterns used herein are not restricted to the Y-bar-shaped ones, but may be of any other suitable shape (T-bar or the like for example), insofar as they perform a similar operation.

Figure 8:
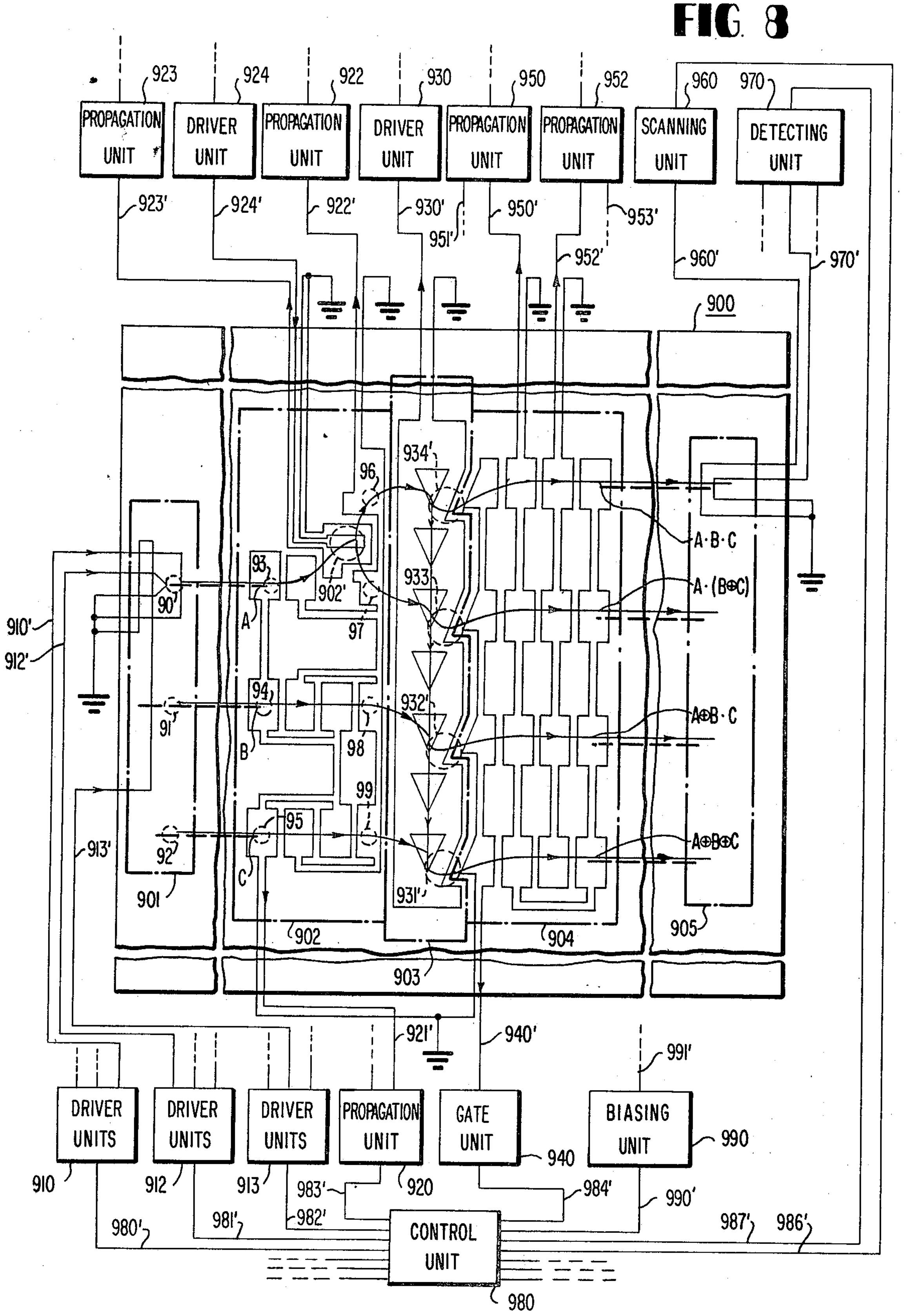
FIG. 8 shows a diagram illustrating in detail the magnetic threshold logic circuit of this invention shown in FIG. 2.

FIG. 8 shows one embodiment of this invention and specifically shows a circuit arrangement which simultaneously carries out, for three input variables A, B and C, four logic operations conforming to the logic functions of $A \cdot B \cdot C$, $A \cdot (B \oplus C)$, $A \oplus B \cdot C$ and $A \oplus B \oplus C$. The magnetic threshold logic circuit of this invention is composed of a magnetic material piece 900 capable of retaining cylindrical magnetic domains, an input circuit 901, a magnetic domain dividing circuit 902, a magnetic domain arrangement circuit 903, a gate circuit 904, and an output circuit 905. Moreover, these circuits are formed on the magnetic material piece. The input circuit 901 for generating cylindrical magnetic domains on the piece 900 in response to external information is constituted by conductor loops 910', 912' and 913'. The conductor loops 910', 912' and 913' are driven by driver units 910, 912 and 913 respectively. In the drawing, only a part of the input circuit 901 and the output circuit 905 is shown for simplicity Although only one input circuit 901 with corresponding sources is illustrated, it will be apparent that three such input circuits are intended to provide the three inputs corresponding to A, B and C. The dividing circuit 902 for dividing the magnetic domains in correspondence with weights is composed of propogation conductor loops 921', 922', and 923' and a magnetic domain division driver unit 924' which are driven by magnetic domain propagation units 920, 922 and, 923 and a magnetic domain division 924, respectively. The circuit 903 for arranging the magnetic domains in a row is constituted by an arrangement conductor loop 930' and thin film patterns (illustrated by wedges in the drawing, and numerals are not attached thereto for clarity of the drawing), and is driven by a magnetic domain arrangement driver unit 930. The gate circuit 904 is for producing outputs corresponding to threshold values, and is composed of gate conductor loop 940', propagation conductor loops 950' and 952', which are driven by gate unit 940, propagation units 950 and 952, respectively. The output circuit 905 for taking out signals from the threshold circuit comprises a scanning conductor loop 960' a detecting conductor loop 970', and the loop 960' is driven by a scanning unit 960. Signals from the circuit 905 are read out by a detecting unit 970. Although a single scanning unit 960 and a single detecting unit 970 are illustrated for reading out the output logic information, it will be apparent that four such readout circuits are intended for reading out the four respective output logic information. Either a single scanning unit 960 could be used for all four outputs, or if selective readout is desired, four separate driving circuits would be used. A biasing magnetic field for forming the cylindrical magnetic domains supplied to the piece 900 in the direction perpendicular to its plane is obtained by giving DC current to a bias coil 991' (omitted for the clarity of the drawing) from the biasing field generating unit 990. Herein, if the biasing magnetic field is applied to the piece 900 in the direction from the face towards the back of the paper, magnetization of the domains obtained is directed from the back to the face of the sheet of the drawing. Introduction of a magnetic domain into the input circuit 901 is carried out in such a manner, for example, that a part of the magnetic domain held within the conductor loop 912' by the application of the magnetic field generated by DC current supplied from the driver unit 912 to the loop 912' is cut away to be supplied to a position 90 by supplying a current conforming to an external information, to the conductor loop 913' from the driver unit 913. At the same time, magnetic domains are introduced at positions 91 and 92. Information 1 and 0 correspond to the presence and absence of the domains at the positions 90, 91 and 92. When both the loops 912' and 913' are arranged on the upper surface of the piece 900, the operation of the current supply in the arrow direction is performed (stated in detail in the explanation of. The magnetic domains generated at the positions 90, 91 and 92 corresponding to input information in the input circuit move rightward as indicated by arrow when a drive current is fed alternately to the propagation conductor loop 910' or 920' by the driver unit 910 or the propagation unit 920. Also, the domains are led to input positions 93, 94 and 95 (signals at these parts are respectively shown as A, B, and C on the magnetic domain dividing circuit 902. The magnetic domains introduced into the positions 93, 94 and 95 of the circuit 902 are moved rightward as indicated by arrow and led to positions 96, 97, 98 and 99 of the dividing circuit 902 by alternately driving the conductor loops 921' or 923' and 922' with the propagation units 920 or 923 and 922, respectively. In this operation when, the signal (magnetic domain) A corresponding to 1 reaches by a magnetic domain dividing means 902' composed of the conductor 923' and the conductor 924'. Current pulses in the directions of arrows as shown are supplied to these loops 923' and 924', respectively, through the propagation unit 923 and the division driver unit 924 upon cutting off of the current pulse on the loop 922' (namely, simultaneously with the application of the current pulse on the conductor loop 921'). Thus, the magnetic domain (the signal A) is divided into two, and respectively fed to the positions 96 and 97 of the circuit 902. The circuit 902 is the same as the one illustrated in FIGS. 3A through 3E. For instance, the means 902' corresponds to the central part 302 of the dividing means 301 of FIG. 3A. The loops 923', 924' and 922' correspond to the driving coils 321, 341 and 351 of FIGS. 3A through 3E, respectively. When the signal A is 0 no magnetic domains appear at the positions 96 and 97. On the other hand, the signals (magnetic domains) B and C are not affected by the magnetic domain dividing operation intermediate the propagation from the input to the positions 98 and 99 of the circuit 902 because no magnetic domain dividing means are provided intermediate the propagation from the input to the positions 98 and 99. As a result, the signals B and C are led to the positions 98 and 99 in their original form.

Thus, and weighting operation is performed in the dividing circuit 902 such that only the signal A is divided into two and the signals B and C remain unchanged. The magnetic domains present in the positions 96, 97, 98 and 99 are given to the magnetic domain arrangement circuit 903.

The application of positive and negative modulating magnetic fields generated by current supplied from the magnetic domain arrangement driving driver unit 930 to the arrangement conductor loop 930' makes it possible to carry out the arrangement of the magnetic domains applied from the positions 96, 97, 98 and 99 of the circuit 902 by the so-called worm motion which utilizes static magnetic field potentials of the thin film patterns(shown in the wedge shape in the drawing) arranged within the arrangement conductor loop 930'. The circuit 903 is similar to one illustrated in FIG. 6B. The arrangement positions in this circuit at which the magnetic domains can stay stably are four places of 931', 932', 933' and 934', and the domains cannot stay stably at other positions. The domains given from the positions 96, 97, 98 and 99 stay temporarily at the nearest arrangement positions 934', 933', 932' and 931', respectively. However, the magnetic domains are moved downward one after another due to the wall motion, and are arranged at the positions 931', 932', 933' and 934' in the order from the bottom. Also the circuitry is formed so that the two magnetic domains may not come closer than the distance between the respectively adjacent magnetic domain arrangement positions by the repelling force between two magnetic domains. The magnetic domains are shifted one by one on the patterns by the worm motion. However, even if more than six shift motions are performed, the arrangement of the magnetic domains does not change. Unless the magnetic domains are taken out, they are permanently kept stored. The read-out of the magnetic domain into the gate circuit 904 from the arrangement circuit 903 is carried out in such a manner that the gate current in the direction of arrow is sent from the gate unit 940 to the gate conductor loop 940'. In this embodiment, the signals (the presence or absence of the magnetic domain) on the respective arrangement positions such as 931', 932', 933' and 934' within the circuit 903 are taken in parallel into the gate circuit 904. However, gate conductor loops may be separately provided selectively driven to open only desired gates. Signal outputs (magnetic domains) taken into the gate conductor loop 940' are moved rightward by alternately supplying current pulses to the propagation conductor loops 950' and 952' from the magnetic domain propagation units 950 and 952, respectively. Thus operation results are obtained at the output section of the gate circuit 904 (in the drawing, the section signifies the parts indicated by $A \cdot B \cdot C$, $A \cdot (B \oplus C)$, $A \oplus B \cdot C$ and $A \oplus B \oplus C$). Although the results are not depicted in detail, they are led to another threshold circuit by the loops 950' and 952', or 951' and 953, and are operated therein. The ultimate output signals (magnetic domains) are read out from the output circuit 905. A scanning current pulse is supplied from the scanning unit 960 to the scanning conductor loop 960' of the circuit 905, whereby the magnetic domain is conducted into the loop. After this operation, the magnetic domain is enlarged or reduced. Then, an output voltage or current which was induced in response to the movement of the magnetic domain or the enlargement or reduction in the diameter of the domain, is detected through the detecting conductor loop 970' by the detecting unit 970. Then, in the unit 970, the output voltage or current is amplified, shaped and taken out in the form of an electrical signal. All the controls of the respective unit (from the input circuit to the output circuit) are performed by a control unit 980, while the reception and transfer of signals between the control unit and the respective units are performed through control conductors 980' 981', 982', 983', 984', 986', 987', and 990'. For clarity of the drawing, no numerals are attached to the control conductors of the propagation units 922, 923, 950 and 952, and the magnetic domain division driver unit 924 and the magnetic domain arrangement driver unit 930.

In the foregoing, the description of the magnetic domain threshold logic circuit of 3 inputs has been given. In summary, the logic operations are carried out in the circuit as follows. When magnetic domains (signals) are received at the input of the circuit, a magnetic domain (information 1) representing signal A is divided into two, while signals B and C are introduced, without affecting the dividing operation, into the arrangement circuit to be arranged therein. These arrangement operations correspond to the performing of analogue addition of $[2A+B+C]$. As a result, since the respective positions of such arrangement circuit 903 give the upper and lower threshold values $t_1$ and $t_2$, each output from each arrangement position of the circuit 903 provides the logic function $[2A+B+C]_{t_1,\,t_2}$. In this case, the output from the lowermost one 931' of the arrangement positions provides a function $[2A+B+C]_{1,0}$ in which the upper limit of the threshold value is 1, i.e. $t_1 = 1$, while the lower limit or $t_2$ is 0. The output from the second arrangement position 932' has $t_1 = 2$ and $t_2 = 1$, and provides $[2A+B+C]_{2,1}$. Similarly, the output from the arrangement position 933' presents $[2A+B+C]_{3,2}$ 2' while the output from 934' produces $[2A+B+C]_{4,3}$. For example, if $A = B = C = 1$ are given to the positions 93, 94 and 95 of the dividing circuit 902, $[2+1+1]_{1,0} = 1$, $[2+1+1]_{2,1} =$ 1, $[2+1=1]_{3,2} = 1$ and $[2=1=1]_{4,3} = 1$, or 1, 1, 1 and 1 appear as the outputs from the respective arrangement positions 931', 932', 933' and 934' of the arrangement circuit 903. Also, if $A = B = 1, C = 0$ or $A = C = 1, B = 0$ are applied, 0 is obtained as the output from the uppermost one 934' of the arrangement positions and 1 appears as each output from each arrangement position of the positions 933', 932' and 931'. In other words, 1, 1, 1 and 0 are obtained as the outputs from the positions 931'932', 933' and 934', respectively. Thus, the logic function $[2A+B+C]_{4,3}$ as the output from the position 934' correspond to the Boolean logic function A B C. Similarly, with respect to other positions 933', 932' and 931', the Boolean logic functions $A \cdot (B \oplus C)$, $A \oplus B \cdot C$ and $A \oplus B \oplus C$ correspond to $[2A+B+C]^{3,2}$ $[2A+B+C]^{2,1}$ and $[2A+B+C]_{1,0}$, respectively. Stated in more detail, if $A = B = C = 1$ are supplied, the logic function $A \cdot B \cdot C = 1$ appears through the position 934' of the circuit 903 and the gate circuit 904 at the output circuit 905 as indicated by a solid line with an arrow mark, and detected thereat by the detecting unit 970. Simultaneously, the Boolean logic functions $A \cdot B \oplus C + 1$, $A \oplus B \cdot C + 1$ and $A \oplus B \oplus C = 1$ are obtained at the output circuit 905 and detected by the detecting units (not shown for simplicity of the drawing) similar to the detecting unit 970. In like manner, if $A = B = 1$, $C = 0$ or $A = C = 1, B = 0$ are given, the Boolean logic function $A \cdot B \cdot C = 0$ appears at the output circuit 905 to be detected by the detecting unit 970. At the same time, the logic functions $A \cdot (B \oplus C) = 1$, $A \oplus B \cdot C = 1$ and $A \oplus B \oplus C = 1$ are gained at the output circuit 905 to be detected by the detecting units (not shown. These outputs from the arrangement positions 931', 932', 933' and 934' correspond to the logic functions $A \oplus B \oplus C$, $A \oplus B \cdot C$, $A \cdot (B \oplus C)$ and $A \cdot B \cdot C$, respectively, so that various logic functions are obtainable within a single arrangement circuit. Accordingly, if the magnetic domains on these arrangement positions are taken out through the gate conductor loop, the threshold circuit for realizing the above-mentioned four sorts of logic functions is obtained. This reveals that a circuitry capable of performing a variety of logic operations with one standard circuit can be formed. Thus, the magnetic threshold logic circuit according to this invention shows remarkable effects particularly when more complicated logic operations are needed.

The respective constituent elements such as the input circuit, dividing circuit, arrangement circuit, gate circuit, propagation circuit, etc. used in the magnetic threshold logic circuit of this invention are not restricted to those circuits employing the conductor pattern and the thin film pattern illustrated in the foregoing embodiments and examples. They may be replaced, however, by any other circuits for carrying out similar operations. For example, as regards the output circuit, other methods for converting the presence and absence of the magnetic domain into an electrical signal, such as a method for directly using the phenomenon of electromagnetic induction to obtain the presence or absence of the magnetic domain (method for converting the amount of change in the magnetic flux to the form of a voltage or current), a method using current-magnetic effects (the Hall effect, magnetio-resistance effect, etc.), a method for using magneto-optical effects (the Faraday effect, Kerr effect, etc. ), and the method for using other magneto-electrical converter circuits may be employed. Furthermore, information from the output circuit may be led in the magnetic form to another magnetic circuit (magnetic domain threshold circuit) without performing the magneto-electrical conversion. Also, the pattern of the drive current or the drive magnetic field as used generally in the threshold logic circuit is not restricted to one which varies in the pulse form. Instead, it may be one which sinusoidally varies and such wave forms are not specifically prescribed.

What is claimed is:

1. A magnetic threshold logic circuit comprising; a flat plate shaped magnetic material capable of retaining cylindrical magnetic domains; first magnetic field generating means for normally providing a biasing magnetic field in a first direction perpendicular to the magnetic material; second magnetic field generating means for applying magnetic field in said first direction and in a second direction opposite to the first direction to predetermined locations on said magnetic plate said latter magnetic field varying with respect to time and space; a plurality of input means for leading cylindrical magnetic domain patterns corresponding to input signals to the magnetic plate; a magnetic domain dividing means for receiving said magnetic field in said first and second directions at a first predetermined order from the second magnetic field generating means and for dividing said cylindrical magnetic domains fed from said plurality of input means into a plurality of predetermined magnetic domains to produce outputs; a magnetic domain arrangement means for receiving the magnetic field in the first and second directions at a second predetermined order from said second magnetic field generating means and for moving the plurality of cylindrical magnetic domains supplied from said dividing means to arrange them at a plurality of predetermined arrangement positions; gate means for moving predetermined ones of said cylindrical magnetic domains arranged at the arrangement positions to produce outputs from the arrangement means; and output means having threshold values corresponding to said plurality of arrangement positions for receiving said magnetic domains fed from the arrangement means under the control of the gate means to generate a plurality of logic outputs corresponding to the threshold values, said respective means being arranged on the magnetic material in the order mentioned above.

2. A magnetic threshold logic circuit according to claim 1, characterized in that said magnetic domain dividing means is constructed by arranging magnetic thin film patterns at predetermined positions on both surfaces of said magnetic material, and that it operates under the control of said second magnetic field generating means.

3. A magnetic threshold logic circuit according to claim 1, characterized in that said magnetic domain dividing means comprises; first input means for introducing cylindrical magnetic domain patterns corresponding to input signals; means for enlarging the domains introduced into said first input means; second input means for introducing a plurality of cylindrical magnetic domains corresponding to a divisional number; means for moving the magnetic domains introduced into said second input means to predetermined positions; and output means for taking out in parallel said magnetic domains at the predetermined positions which was influenced by said magnetic domains enlarged by said enlarging means, said respective means being arranged on said magnetic material.

4. A magnetic threshold logic circuit according to claim 1, characterized in that said magnetic domain arrangement means comprises; a plurality of input means for introducing cylindrical magnetic domains corresponding to input signals; means for moving the magnetic domains introduced into said input means to predetermined positions; means located at a position adjacent to said moving means for normally retaining one cylindrical magnetic domain; and means for controlling enlargement of said one cylindrical magnetic domain of said domain retainer means, said respective means being arranged on said magnetic material, and that said cylindrical magnetic domains at said predetermined positions which was influenced by the enlargement of said one cylindrical magnetic domain are arranged in a row.

5. A magnetic multiple logic circuit comprising a. a plurality of magnetic weighting means each responsive to a magnetic bubble being applied at an input position thereon for providing a predetermined number of magnetic bubbles at an output position thereon, b. a magnetic arrangement means, having a predetermined number of positions for stably holding magnetic bubbles, for arranging magnetic bubbles initially placed in any of said number of positions in predetermined ones of said positions dependent on the number of positions initially having magnetic bubbles thereon and independent of the initial position of said magnetic bubbles, c. first magnetic transfer means for transferring magnetic bubbles at the output positions of said weighting means to predetermined holding positions of said arrangement means, and d. plural magnetic gating means for transferring magnetic bubbles at said positions in said arrangement means, after arrangement, to output locations of said logic circuit means, a magnetic bubble at any output location indicating a logic combination different than that indicated by a magnetic bubble at any other output location.

6. A magnetic multiple logic circuit as claimed in claim 5 wherein at least one of said magnetic weighting means comprises, a. a plate shaped magnetic material capable of retaining magnetic bubbles when a magnetic field of certain strength is applied in the easy axis direction of said magnetic plate, b. first magnetic field generating means for moving a magnetic bubble from a first position on said plate, corresponding to an input position, to a second position on said plate, and c. second magnetic field generating means for applying a magnetic field to said second position to split any magnetic bubble at said second position into a predetermined number of magnetic bubbles.

7. A magnetic multiple logic circuit as claimed in claim 6 wherein said first and second generating means comprises a bias magnetic field applied in the easy axis direction of said plate, a plurality of current conducting loops positioned to provide magnetic fields at and between said first and second positions, and current driving means for selectively applying current to said current conducting loops.

8. A magnetic multiple logic circuit as claimed in claim 5 wherein at least one of said weighting means comprises, a. a plate shaped magnetic material capable of retaining magnetic bubbles when a proper magnetic field is applied in the easy axis direction of said magnetic plate, b. means for applying a biasing magnetic field in the easy axis direction of said plate, c. a first conducting wire laid out with respect to said plate to form a first loop at least partially surrounding a small location on said plate, d. means for applying a current to said first conducting means to cause a magnetic field to be applied to said small location, which in combination with said biasing magnetic field is sufficient to retain a magnetic bubble at said second location, e. a second conducting wire laid out with respect to said plate and said wire to form at least one second loop which would intersect any magnetic bubble retained in said small location, and f. means for applying a current to said second wire to cause a further magnetic field to be applied within said second loop(s), which, in combination with said other magnetic fields causes a collapse of said magnetic bubble only at portions intersected by said second loop, to result in a plurality of magnetic bubbles being created.

9. A magnetic multiple logic circuit as claimed in claim 5 wherein at least one of said weighting means comprises, a. a plate shaped magnetic material capable of retaining magnetic bubbles when a proper magnetic field is applied in the easy axis direction of said magnetic plate, b. means for applying a biasing magnetic field in the easy axis direction of said plate, c. a plurality of thin film magnetic elements arranged on said plate, d. means for generating a rotating magnetic field in the plane of said plate which magnetizes said thin film elements to retain a magnetic bubble at plate positions adjacent a magnetic pole of said thin film elements, the said "retaining" pole on each said thin film element rotating with the rotation of said planar magnetic field, e. at least some of said thin film elements being arranged in positions such that when the planar magnetic field rotates from a first direction to a second direction said "retaining" pole moves from a first location to at least two second locations equally spaced from said first location, whereby a magnetic bubble retained at said first location when said magnetic field is in said first direction will split and move to said second locations when said magnetic field rotates to said second direction.

10. A magnetic multiple logic circuit as claimed in claim 5 wherein at least one said weighting means comprises, a. a plate shaped magnetic material capable of retaining magnetic bubbles when a proper magnetic field is applied in the easy axis direction of said magnetic plate, b. means for applying a biasing magnetic field in the easy axis direction of said plate, c. a plurality of thin film magnetic elements arranged on said plate, d. means for generating a rotating magnetic field in the plane of said plate which magnetizes said thin film elements to retain a magnetic bubble at plate positions adjacent a magnetic pole of said thin film elements, the said retaining pole on each said thin film element rotating with the rotation of said planar magnetic field, e. said thin film elements being arranged with respect to each other as follows:

i. a first thin film element, having a number of points thereon which successively become retaining pole points as said planar magnetic field is rotated, adapted to hold a magnetic bubble and move it from point to point as said retaining pole moves, ii. a first group of thin film elements, each having a number of points thereon which successively become retaining pole points as said planar magnetic field is rotated and each being adapted to hold a magnetic bubble and move it from point to point as said retaining pole moves, iii. a second group of thin film elements, each having at least one point, adjacent respectively to one of said first group elements, which becomes a retaining pole when said planar magnetic field is in a first direction, each said one point being positioned with respect to a corresponding element of said first group such that a magnetic bubble at a retaining pole on said corresponding element will jump to said one retaining point of said second group element when said planar magnetic field rotates to said first direction only if an additional force pushes said bubble in the direction towards said element of said second group, f. a conducting wire laid out with respect to said plate and said thin film elements to form a loop at least partially surrounding one point on said first thin film element and extending adjacent to all said elements of said first group on the opposite side of said first group from said second group of elements, and g. means for applying a current to said conducting wire to cause any magnetic bubble at said one point of said first element to expand and be held within said loop, whereby the repulsion between said expanded bubble and any magnetic bubbles retained by said second group of elements provides said additional force.

11. A magnetic multiple logic circuit as claimed in claim 5 wherein said arrangment means comprises, a. a plate shaped magnetic material capable of retaining magnetic bubbles when a magnetic field of certain strength is applied in the easy axis direction of said magnetic plate, b. means for applying a bias magnetic field to said plate in the easy axis direction, said field being sufficient to enable said plate to retain magnetic bubbles, c. a thin film magnetic element on a location of said plate adapted to hold a magnetic bubble in said plate at said location, d. a conducting wire positioned with respect to said plate to form an elongated loop which encompasses said thin film magnetic element at one end of said elongated loop, e. means adapted to supply a plurality of magnetic bubbles to positions near said loop away from said thin film element, and f. means for applying a current to said conducting wire to cause said plurality of bubbles to enter said loop and stack up at the opposite end of said loop from said thin film element.

12. A magnetic multiple logic circuit as claimed in claim 5 wherein said arrangement means comprises, a. a plate shaped magnetic material capable of retaining magnetic bubbles when a magnetic field of certain strength is applied in the easy axis direction of said magnetic plate, b. means for applying a bias magnetic field to said plate in the easy axis direction, c. a plurality of thin film magnetic elements arranged in a column on said plate, each of said elements being capable of holding a magnetic bubble on a corresponding location of said plate, d. a conducting wire positioned with respect to said plate and said elements to form a loop around said column of elements, e. means for supplying a plurality of bubbles to positions adjacent respective ones of said elements, and f. means for applying a time varying current to said conducting wire to cause said adjacent bubbles to move to adjacent elements and then move from element to element towards one end of said column, the final position of any bubble being dependent on the number of bubbles between said bubble and said one end.

13. A magnetic logic circuit as claimed in claim 5 wherein said arrangement means comprises, a. a plate shaped magnetic material capable of retaining magnetic bubbles when a magnetic field of certain strength is applied in the easy axis direction of said magnetic plate, b. means for applying a bias magnetic field to said plate in the easy axis direction, c. a plurality of thin film magnetic elements arranged on said plate, d. means for generating a rotating magnetic field in the plane of said plate which magnetizes said thin film elements to retain a magnetic bubble at plate positions adjacent a magnetic pole of said thin film elements, the said retaining pole on each said thin film element rotating with the rotation of said planar magnetic field, e. said thin film elements being arranged with respect to each other as follows:

i. a first group of thin film elements forming rows of such elements, said elements being shaped and positioned relative to one another to cause a magnetic bubble in any row to move in a first direction from retaining pole to retaining pole the end of said row and to move to the next adjacent lower row, provided said lower row does not contain a bubble, when said planar magnetic field is rotated through a number of cycles, ii. second group of thin film elements, one adjacent to the end of each row of said first group, each of said second group elements having at least one point, adjacent said row end, which becomes a retaining pole when said planar magnetic field is in a first direction, said one point being positioned with respect to said row end such that magnetic bubble at said row end will jump to said retaining pole on said element of said second group when said magnetic field rotates to said first direction, provided, also, an additional magnetic field is applied to expand said bubble towards said point, f. a conducting wire positioned with respect to said elements and said plate to form a loop which intersects said row ends and is essentially between said row ends and said second group of elements, and g. means for applying a current to said conducting wire to expand any bubbles held at said row ends in the direction of said second group elements. strength is applied in the easy axis direction of said magnetic plate, b. means for applying a bias magnetic field to said plate in the easy axis direction, c. a plurality of thin film magnetic elements arranged on said plate, d. means for ge

* * * * *

UNITED STATES PATENT OFFICE
CERTIFICATE OF CORRECTION

Patent No. 3,743,851 Dated July 3, 1973

Inventor(s) HARUKI KOHARA

It is certified that error appears in the above-identified patent and that said Letters Patent are hereby corrected as shown below:

IN THE SPECIFICATION:

Column 4

Line 19, delete "FIG. 4" and insert --FIG. 4A--

Line 48, delete "doamin" and insert --domain--

Line 49, delete "24-1" and insert --25-1--

Column 6

Line 18, delete "meand" and insert --means--

Line 28, delete "320" and insert --310--

Column 8

Line 6, delete "magnetic" (second occurrence)

Line 61, after "carried out." start a new paragraph by deleting "in" and inserting --In--

Column 10

Line 6, delete "numberals" and insert --numerals--

Column 11

Line 24, delete "numberal" and insert --numeral--

UNITED STATES PATENT OFFICE
CERTIFICATE OF CORRECTION

Patent No. 3,743,851 Dated July 3, 1973

Inventor(s) HARUKI KOHARA

It is certified that error appears in the above-identified patent and that said Letters Patent are hereby corrected as shown below:

IN THE SPECIFICATION: (Page 2)

Column 11 (Cont'd)

Line 53, delete "possi-" and insert --posi- --

Column 12

Line 39, delete "anc" and insert --and--

Line 51, delete "introduct" and insert --introduc--

Column 13

Line 48, delete "mangetic" and insert --magnetic--

Column 14

Line 15, delete "curret" and insert --current--

Column 19

Line 7, delete "$[A + B + C]_{1, 0}$" and insert --$[A + B + C]_{1, 0'}$--

Line 8, delete the subscript "24"

Lines 14 and 15, delete "A + C + 1 and B + 0" and insert --A = C = 1 and B = 0--

Lines 15 and 16, delete "$[1 = 0 = 1]_{1, 0} = 1$" and insert --$[1 + 0 + 1]_{1,0} = 1$--

UNITED STATES PATENT OFFICE
CERTIFICATE OF CORRECTION

Patent No. 3,743,851 Dated July 3, 1973

Inventor(s) HARUKI KOHARA

It is certified that error appears in the above-identified patent and that said Letters Patent are hereby corrected as shown below:

IN THE SPECIFICATION: (Page 3)

Column 20

Line 36, after "960'" insert --,--

Column 21

Line 3, after "of" insert --the input circuit 303 in Figure 3A)--

Line 19, delete "by"

Line 21, before "923'" insert --loop--

Line 21, before "924'" insert --loop--

Line 46, after "Thus," delete "and" and insert --the--

Line 54, delete "driving"

Column 22

Line 67, after "while" insert --two magnetic domains representing--

USCOMM-DC 60376-P69
★ U.S. GOVERNMENT PRINTING OFFICE : 1969 O—366-334.

UNITED STATES PATENT OFFICE
CERTIFICATE OF CORRECTION

Patent No. 3,743,851 Dated July 3, 1973

Inventor(s) HARUKI KOHARA

It is certified that error appears in the above-identified patent and that said Letters Patent are hereby corrected as shown below:

IN THE SPECIFICATION: (Page 4)

Column 23

Lines 18 and 19, delete "$[2 + 1 = 1]_{3, 2} = 1$" and insert --$[2 + 1 + 1]_{3, 2} = 1$--

Line 19, delete "$[2 = 1 = 1]$" and insert --$[2 + 1 + 1]$--

Lines 33 and 34, delete "$[2A + B + B]^{3, 2}$" and insert --$[2A + B + C]_{3, 2}$--

Line 34, delete "$[2A + B + C]^{2, 1}$" and insert --$[2A + B + C]_{2, 1}$--

Lines 40 and 41, delete "$A \cdot B \oplus C + 1, A \oplus B \cdot C + 1$" and insert --$A \cdot B \oplus C = 1, A \oplus B \cdot C = 1$--

Column 24

Line 14, delete "magnetio" and insert --magnetic--

UNITED STATES PATENT OFFICE
CERTIFICATE OF CORRECTION

Patent No. 3,743,851 Dated July 3, 1973

Inventor(s) HARUKI KOHARA

It is certified that error appears in the above-identified patent and that said Letters Patent are hereby corrected as shown below:

IN THE CLAIMS: (Page 5)

Column 26,

Line 56, after "said" insert --first--

Column 30

Delete lines 10 through 16 in their entirety.

Signed and sealed this 2nd day of April 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.